(12) United States Patent
Saldana

(10) Patent No.: US 6,909,935 B2
(45) Date of Patent: Jun. 21, 2005

(54) METHODS WITH RESOLUTION ENHANCEMENT FEATURE FOR IMPROVING ACCURACY OF CONVERSION OF REQUIRED CHEMICAL MECHANICAL POLISHING PRESSURE TO FORCE TO BE APPLIED BY POLISHING HEAD TO WAFER

(75) Inventor: Miguel Angel Saldana, Fremont, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 10/789,486

(22) Filed: Feb. 26, 2004

(65) Prior Publication Data

US 2004/0166771 A1 Aug. 26, 2004

Related U.S. Application Data

(62) Division of application No. 09/823,151, filed on Mar. 29, 2001, now Pat. No. 6,725,120.

(51) Int. Cl.⁷ .............................................. G06F 19/00
(52) U.S. Cl. ...................... 700/121; 438/691; 438/692; 438/959; 341/108; 341/126; 341/131; 341/155
(58) Field of Search ......................... 700/121; 438/691, 438/692, 959; 341/108, 126, 131, 155; 451/5, 41, 66; 348/614

(56) References Cited

U.S. PATENT DOCUMENTS

| | | | | |
|---|---|---|---|---|
| 5,289,500 A | * | 2/1994 | Inou et al. | 375/224 |
| 5,623,318 A | | 4/1997 | Lee | 348/614 |
| 5,769,697 A | * | 6/1998 | Nishio | 451/41 |
| 5,916,012 A | | 6/1999 | Pant et al. | 451/41 |
| 6,139,400 A | | 10/2000 | Sato et al. | 451/10 |
| 6,140,953 A | | 10/2000 | Fukuyama | 341/144 |
| 6,422,918 B1 | | 7/2002 | Avanzino et al. | 451/41 |

FOREIGN PATENT DOCUMENTS

EP 2 162 977 A 12/1986 ............ H03M/7/00

OTHER PUBLICATIONS

F.S. Lai, "*The Architecture and Analysis of a Hybrid Number System Processor*", 1992 IEEE, IBM Thomas J. Watson Research Ctr., Yorktown Heights, NY.

Samueli, H., "*An Improved Search Algorithm for the Design of Multiplierless FIR Filters with Powers–of–Two Coefficients*", pp. 1044–1047, IEEE Transactions on Circuits and Systems, vol. 36, No. 7, Jul. 1989.

Avizienis, "*Signed–Digit Number Representations for Fast Parallel Arithmetic*", pp. 389–400, IRE Transactions on Electronic Computers, Sep. 1961.

* cited by examiner

*Primary Examiner*—Leo Picard
*Assistant Examiner*—Charles Kasenge
(74) *Attorney, Agent, or Firm*—Martine Penilla & Gencarella, LLP

(57) ABSTRACT

CMP methods in which a polishing pad is moved relative to a wafer and a retainer ring implement instructions for applying required pressure to the wafer for CMP operations. Accuracy of computations of the pressures, and of conversion of the pressure to force, is improved without use of high resolution components, such as high resolution digital devices. Such improved accuracy is achieved using both digital and analog operations, and by converting values of required pressure or force from one set of units to a second set of units and then back to the first set of units. A quantization process is performed using data processed by average resolution digital devices. The process transfers both pressure/force scale and pressure/force set point data between separate processors to obtain computed values of pressure and force having acceptable accuracy, such that quantization errors are eliminated or significantly reduced.

17 Claims, 16 Drawing Sheets

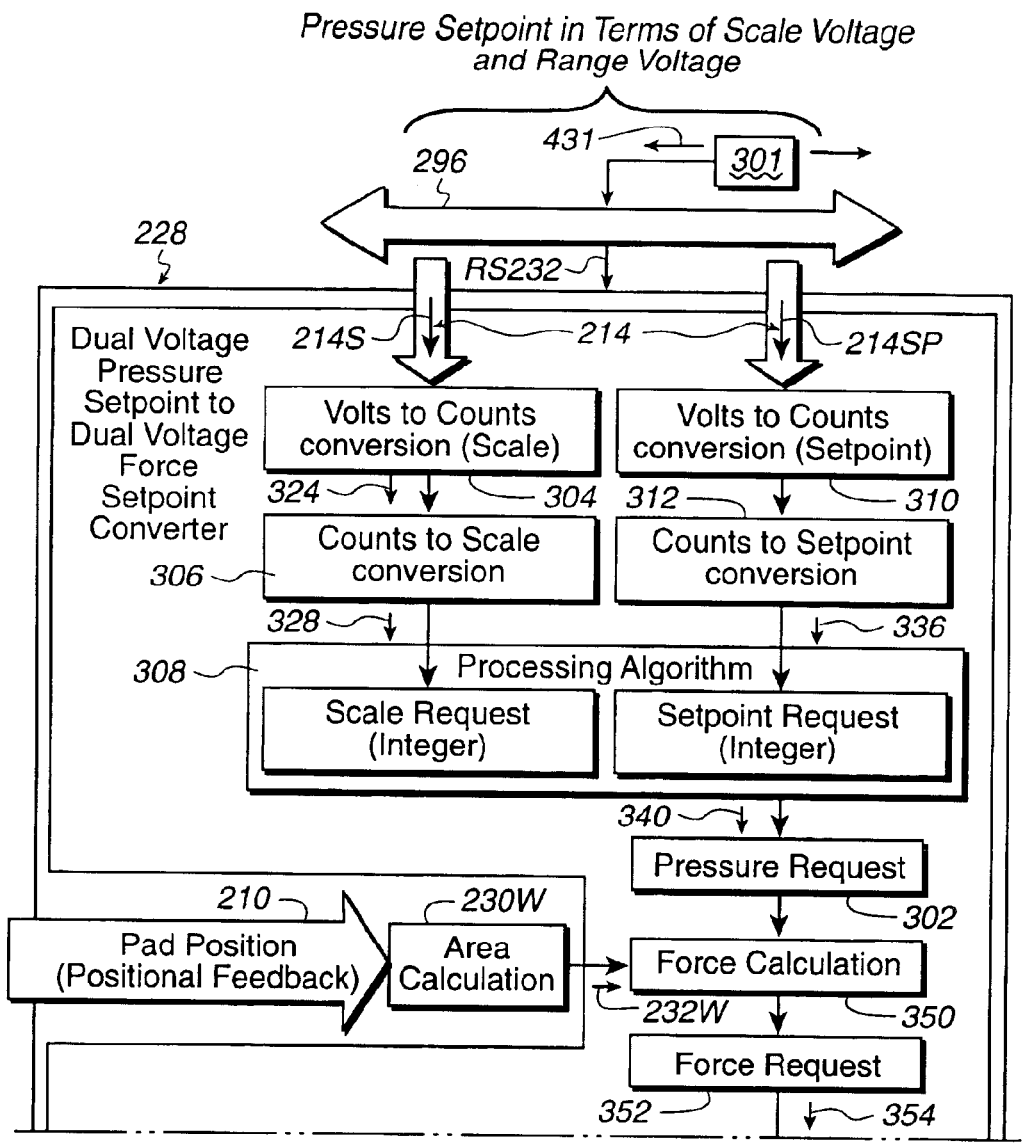
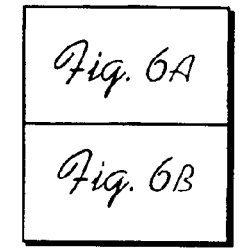
Fig. 6A
Fig. 6

METHODS WITH RESOLUTION ENHANCEMENT FEATURE FOR IMPROVING ACCURACY OF CONVERSION OF REQUIRED CHEMICAL MECHANICAL POLISHING PRESSURE TO FORCE TO BE APPLIED BY POLISHING HEAD TO WAFER

RELATED APPLICATIONS

The present application is a divisional of U.S. patent application Ser. No. 09/823,151, filed on Mar. 29, 2001, now U.S. Patent No. 6,725,120, entitled "APPARATUS AND METHODS WITH RESOLUTION ENHANCEMENT FEATURE FOR IMPROVING ACCURACY OF CONVERSION OF REQUIRED CHEMICAL MECHANICAL POLISHING PRESSURE TO FORCE TO BE APPLIED BY POLISHING HEAD TO WAFER", by Miguel A. Saldana (the "Parent Application"), priority under 35 U.S.C. 120 is hereby claimed based on the Parent Application, and such Parent Application is hereby incorporated by reference.

BACKGROUND OF THE INVENTION

1. Field of the Invention

The present invention relates generally to high performance systems and techniques for polishing workpieces. Specifically, the present invention relates to chemical mechanical polishing (CMP) methods for improving the accuracy of conversion of data representing required CMP pressures to data representing CMP forces to be applied by a polishing (or planarization) head to a workpiece such as a semiconductor wafer, wherein quantization errors are minimized even though components having average resolution are used to provide some of the data used in the conversion operations.

2. Description of the Related Art

In the fabrication of semiconductor devices, CMP operations are performed for buffing, cleaning, planarization, and polishing of wafers. A typical semiconductor wafer may be made from silicon and may be a disk that is 200 mm or 300 mm in diameter. The term "wafer" is used below to describe and include such semiconductor wafers and other planar structures, or substrates, that are used to support electrical or electronic circuits.

As integrated circuit device complexity increases, there is an increased need to improve the accuracy of CMP operations for planarizing dielectric materials deposited onto wafers. Also, as more metallization line patterns are formed in the dielectric materials, there is an increased need for higher accuracy in CMP operations that remove excess metallization.

In a typical CMP system, a wafer is mounted on a carrier with a surface of the wafer exposed. The carrier and the wafer rotate in a direction of rotation. The CMP process may be achieved, for example, when the exposed surfaces of the rotating wafer and of a polishing pad are urged into contact with each other by a polishing force, and when the wafer and the polishing pad move laterally relative to each other.

Two aspects of achieving accuracy of the polishing force applied to a wafer are of interest. Once a value of a required polishing pressure is specified, that value must first be accurately converted to a corresponding required force and then to a required force signal that accurately represents the required force. The force signal is applied to a force-producing device. Secondly, the actual force applied by the force-producing device must be measured and fed back to adjust the force signal. Improvements have been made to facilitate making repeatable measurements of the actual polishing forces applied to the wafer. However, there is still a need to more accurately convert the value of the required pressure to the value of the force signal. Such need exists, for example, in CMP systems in which the value of the required CMP force must be rapidly changed in relation to rapidly changing values of the exposed area of the wafer that is in contact with the polishing pad as the lateral position of the polishing pad changes relative to the wafer. CMP systems and methods in which the value of the required polishing forces are rapidly changed according to such rapidly changing values of the contact areas are described in co-pending U.S. patent application Ser. No. 09/748708, filed Dec. 22, 2000, entitled "POLISHING APPARATUS AND METHODS HAVING HIGH PROCESSING WORKLOAD FOR CONTROLLING POLISHING PRESSURE APPLIED BY POLISHING HEAD," by Miguel A. Saldana and Damon V. Williams (the Prior Application). Such Prior Application is hereby incorporated by reference.

The CMP systems and methods of the Prior Application implement a recipe (or set of instructions) for laterally moving the polishing pad relative to a wafer carrier and to a retaining ring on the carrier. The relative movement results in the rapidly changing values of the contact area between the polishing pad and the exposed surface of the wafer, and between the pad and a conditioning puck. Feedback of polishing pad position is coordinated with determinations of required values of the variable force by which such different contact areas are separately urged into contact with the polishing pad so that the pressure on each such different contact area may be controlled. The feedback is generated by an encoder that indicates the actual successive lateral positions of the polishing pad relative to the wafer, for example. The different value of each such separate contact area is determined based on the output of the encoder. For each respective pair of one such contact area and one such pressure to be applied to that contact area, a force signal is output (commanded) to represent a corresponding requested force. Each respective force signal is applied to the force-producing device (e.g., an actuator) which provides the force by which the one such contact area of the wafer, for example, is separately urged into contact with the polishing pad at the particular time at which the actual lateral position is measured.

Even though the invention of the Prior Application enables conversions of the value of the required pressure to the force signal, there is a need to increase the resolution of the commanded force signal when the actuator that is used displays analog controllability better than that of conventional digital control methods. For example, conventional pneumatic actuators have a low (or coarse) resolution, which provides steps or increments of 2.5 pounds of force. With such coarse resolution, the actuator may be used with the conventional digital control methods having a 10 bit resolution, for example. In detail, a range of polishing pressure may be 10 psi for a 200 mm wafer that has an area of about 50.26 square inches. The maximum force is 502.6 pounds (10 psi×50.26 sq. in.). Force increments corresponding to the 10 bits are about 0.49 pounds (the force divided by the 1024 steps of the resolution). Thus, the increments of the mechanical resolution are more coarse than the 10 bit digital increments. However, when the actuator is a high resolution actuator capable of applying force in increments substantially less than 2.5 pounds (e.g., much less than the above exemplary 0.49 pounds), the conventional digital control methods do not provide the small increments of the commanded force signal that are necessary to take advantage of the high actuator resolution.

Another example illustrates errors that may result from use of devices having too low a resolution. Resolution is generally defined as 2 bit, 4 bit, n bit, etc. The number of output signals (or counts or steps) is 2 to the nth power. Thus, the very low 2 bit resolution corresponds to four counts or steps. In the context of the above-described required pressure, the resolution of the above-described digital methods dictates aspects of the force computation for converting the required pressure to the required force and to the value of the required force signal, and those aspects have an effect on accuracy. For example, the very low 2 bit resolution would correspond to a very low 2 bit computational resolution. Use of the 2 bit computational resolution would provide that a 10 psi pressure range be divided into four parts, such as discrete steps at 2.5 psi intervals, i.e., pressure values of 0, 2.5, 5.0, 7.5, and 10 psi. If the CMP system performs the conversion computations with respect to a required pressure having a value of 8.25 psi, for example, the increments (or steps) of the pressure may be 0.25 psi, which may be referred to as a parameter resolution increment. Also, 7.5 psi would be the value of the available output pressure step that is closest to the required 8.25 psi pressure. An accuracy problem resulting from such low resolution is shown by an example in which the required pressure value of 8.25 psi is to be input for processing. The conversion computation must convert the value of the required pressure (e.g., from psi to counts to voltage to counts and back to psi). Ideally, after the conversions, the required pressure would be output as exactly 8.25 psi. However, if the very low 2 bit resolution is used, the value of the required pressure would not exactly match the absolute value of any of the 0, 2.5, 5.0, 7.5, or 10 psi values of the steps of the pressure range. Use of the 7.5 psi value to represent the required 8.25 psi pressure would result in an error of 0.75 psi, or an error of 9.1 percent (9.1%) of the required 8.25 psi. Such a large error in current CMP systems would be unacceptable.

With this example in mind, the term "quantization" is used herein to refer to a process of computation in which computational resolution is of significant importance in obtaining a computed result having an acceptable accuracy. A "quantization process" is quantization in which an initial value of a parameter is subjected to computational operations to obtain the computed result. Such exemplary 9.1% error resulting from the above exemplary quantization is referred to herein as a "quantization error". Generally, a high value of resolution results in steps having a small absolute value. With this in mind, in a normal situation, an unacceptable quantization error may result from performing the computation using too low a value of the computational resolution. For example, the above very low resolution may be the very low computational resolution (2 bits). A high absolute value (2.5 psi) of the steps of the computational resolution in such example was determined by dividing the count value of the very low 2 bit computational resolution (i.e., 4) into the 10 psi pressure range. Such high absolute value of the computational steps results in fewer steps. On the other hand, in the example the absolute value of the pressure (or parameter) increments (0.25 psi) is much less than the absolute value 2.5 psi. As noted above, the values of the exemplary 9.1% quantization error is unacceptable.

If a higher computational resolution were used, such as a 3 bit resolution, then the 10 psi pressure range would be divided by 8 (2 to the third power), and each step based on the higher resolution would have a smaller absolute value (1.25 psi). Use of the 1.25 psi absolute value steps would provide a computational step of 8.0 psi closest to the exemplary required 8.25 psi, and a quantization error of 0.25 psi, or 3.03 percent (3.03%) of the required 8.25 psi. This example shows that as the computational resolution increases, the number of steps increases, the value of each step decreases, and the quantization error decreases.

The method of determining the quantization error in each of the above-described examples is referred to as the "normal criteria" for determining whether an acceptable quantization error will result from the use of relatively low component resolution digital devices, such a digital to analog converters and analog to digital converters. Such normal criteria is not based on the principles of the present invention.

Continuing to use such digital devices as one example of a component having an availability that decreases as resolution increases, such digital devices are essential in determining the values of the command signals (voltages) applied to the actuators. However, there is limited availability of such digital devices having high component resolution (e.g., in excess of about 10 or 12 bits). Reference is made to the above-described need to increase the resolution of the commanded force signal when the actuator that is used displays analog controllability better than that of conventional digital control methods. Such need to increase component resolution is in conflict with the limited availability noted above. Therefore, as a basis for assuring availability of components, there is a need to use average resolution digital devices of 10 to 12 bits and at the same time increase the resolution of the commanded force signals. However, conventional ways of processing digital device output, and of performing the above conversions, for example, in the processing of the above-described pressure, area and force values, are in part based on use of the less available, high resolution digital devices, for example.

What is needed then, is a CMP method in which the accuracy of pressure and force command signals exceeds the resolution of mechanical actuating devices and which is less dependent on the use of high resolution, less available, components such as high resolution digital devices. In the required CMP method, such need is for a way to more accurately compute the value of forces to be applied to a wafer carrier, for example, as a polishing pad moves laterally relative to such wafer carrier during the CMP operation, wherein such computational accuracy does not depend on the use of high resolution digital devices. Moreover, such improved accuracy should be achieved even though the computation involves both digital and analog operations. Further, this improved computational accuracy should be achieved even though it may be necessary to convert values of required pressure or force, for example, from one set of units to a second set of units and then back to the first set of units. In such conversion, a value of a required pressure, for example, in the first set of units should have the same value after the conversion as before the conversion. In another sense, then, what is needed are methods for quantization, which are effective without the use of high resolution digital devices, and in which the resulting average computational resolution is of less importance in obtaining computed results having an acceptable accuracy, such that quantization errors are eliminated or significantly reduced.

SUMMARY OF THE INVENTION

A further aspect of the present invention relates to reducing quantization error in a computation by defining synchronization data for synchronizing computational operations of first Broadly speaking, the present invention fills these needs by providing CMP methods in which the accuracy of pressure and force computations is less dependent on the use of high resolution, less available components, such as high resolution digital devices such as digital to analog converters and analog to digital converters. The CMP methods of the present invention provide a way to more accurately compute the values of forces to be applied to a wafer carrier, for example, as a polishing pad moves laterally relative to such wafer carrier during the CMP operation. Such computational accuracy does not depend on the use of high resolution digital devices. Moreover, such improved accuracy is achieved even though the computation involves both digital and analog operations, and even though it may be necessary to convert values of required pressure or force, for example, from one set of units to a second set of units and then back to the first set of units. In such conversion, a pressure value, for example, in the first set of units may have the same value after the conversion as before the conversion. The present CMP methods enable a quantization process to be performed without the use of data from high resolution digital devices, and in which an average computational resolution is of less importance in obtaining computed results having an acceptable accuracy, such that quantization errors are eliminated or significantly reduced.

An aspect of the present invention relates to a method of accurately representing, for computational processing, a required value among a pressure range of values of pressure to be applied to a wafer in chemical mechanical polishing. Operations of the method include dividing the pressure range by the value of a component resolution to define scale portions of the pressure range. Another operation generates a first output signal to identify one of the scale portions that includes the required value. A final operation generates a second output signal to identify a set point that defines the requested value in the identified scale portion.

Yet another aspect of the present invention relates to more accurately representing, for computational processing, a required value of a variable parameter, the value being among a range of parameter values. A system component, such as a digital device, is selected and has an operational resolution defined in terms of a number of increments. A computational signal range of a computational signal is defined to represent the amount by which the required values of the parameter may vary in the parameter range. A processor is programmed to divide the computational signal range by the number of increments of the operational resolution to represent a plurality of scales within the parameter range, each of the scales having a given number of units per increment, the number of scales being about equal to the number of increments. One of the scales is selected and includes a set point that identifies the required value of the parameter, the selected scale having a scale range of units. The selected scale is represented in terms of a first output signal that is within the computational signal range, and the set point is represented in terms of a second output signal that is within the computational signal range.

A further aspect of the present invention relates to reducing quantization error in a computation by defining synchronization data for synchronizing computational operations of first and second digital processors. The computational operations are performed on data representing a parameter. Based on the synchronization data, first and second data converting operations are performed by the first digital processor. The first data converting operation converts an initial value of the parameter to first digital data corresponding to one scale of a plurality of scales in a scale function. The one scale identifies one range of values of the parameter within an entire set of values of the parameter. The second data converting operation converts the initial value to second digital data corresponding to a range function that identifies one set point in the one range of values corresponding to the scale. Based on the synchronization data, the second digital processor converts the first and second digital data to a data item that digitally represents the exact initial value of the parameter.

An additional aspect of the present invention relates to reducing quantization error in a computation of CMP pressure. The synchronization data is defined for synchronizing operations of the first and second digital processors. The synchronization data defines a computational resolution, a set of values of the pressure to be used in computations, a set of values of output pressure data for communications between the first and second digital processors, a scale data conversion function that defines a relationship between a required polishing pressure and each one of a plurality of scales into which the set of values of the pressure is divided; and a set point data conversion function that defines a relationship between a range of the pressures in a particular one of the scales and a set point that defines one value of the required pressure in the particular scale. The first processor performs a first conversion operation based on the synchronization data. The first conversion operation is performed on a required value of the pressure, and converts the required value of the pressure to first output pressure digital data representing a particular one of the scales. The first digital processor also performs a second conversion operation based on the synchronization data. The second conversion operation is performed on the required value of the pressure to convert the required value to second output pressure digital data representing the set point that defines the required pressure in the particular scale. In the second processor a third conversion operation is performed based on the synchronization data. The third conversion operation is performed to convert the first output pressure digital data to scale data representing the particular one of the scales. A fourth conversion is performed by the second digital processor based on the synchronization data. The fourth conversion operation is performed on the second output pressure digital data to convert the second output pressure digital data to digital data more accurately representing the required value of the pressure.

BRIEF DESCRIPTION OF THE DRAWINGS

The present invention will be readily understood by the following detailed description in conjunction with the accompanying drawings, wherein like reference numerals designate like structural elements.

FIG. 6 is a schematic diagram illustrating how to join FIGS. 6A and 6B;

FIG. 6A is a schematic diagram of one of two sections of the second digital processor that converts pressure request data to a pressure request;

DETAILED DESCRIPTION OF THE PREFERRED EMBODIMENTS

An invention is described for CMP methods that provide solutions to the above-described problems. Such CMP methods render the accuracy of CMP-related computations less dependent on the use of less available, high resolution components, such as high resolution digital devices. Such CMP methods of the present invention provide a way to more accurately compute values of required pressure and forces to be applied to a wafer carrier, for example, as a polishing pad moves laterally relative to such wafer carrier during the CMP operation. Such CMP methods enable a quantization process to be performed without the use of high resolution components, so that a resulting average computational resolution is of less importance in obtaining computed results having an acceptable accuracy. As a result, quantization errors are eliminated or significantly reduced.

In the following description, numerous specific details are set forth in order to provide a thorough understanding of the present invention. It will be understood, however, to one skilled in the art, that the present invention may be practiced without some or all of these details. In other instances, well known process operations and structure have not been described in detail in order not to obscure the present invention.

Figure 1A:
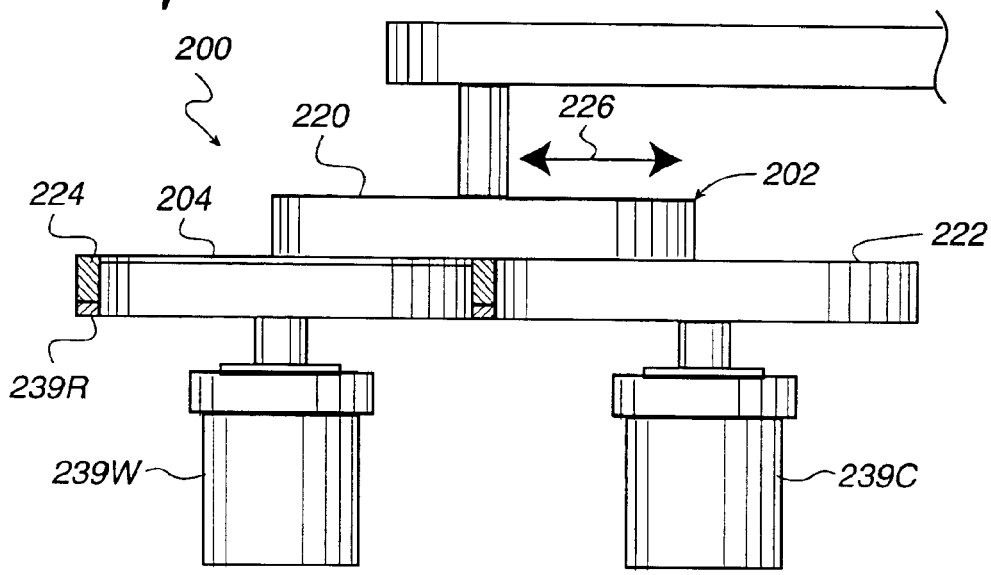
FIG. 1A is a schematic elevational view showing a preferred embodiment of the present invention in which a polishing head contacts a contact area of a wafer mounted on a wafer carrier.
Figure 1B:
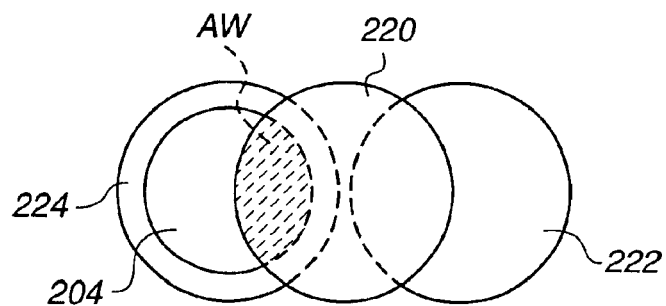
FIG. 1B is a plan view of FIG. 1A, schematically illustrating an initial position of the polishing head and by dashed lines identifying an initial contact area between the wafer and a polishing pad on the head.
Figure 1C:
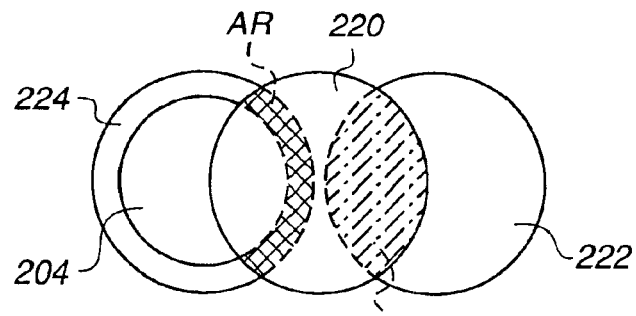
FIG. 1C is a plan view similar to FIG. 1B, illustrating the initial position of the polishing head and in cross hatch lines identifying an initial contact area between a retainer ring surrounding the wafer and the polishing pad on the head, and in dashed-dot lines identifying an initial contact area between a puck carried by a pad conditioner carrier and the polishing pad on the head.
Figure 1D:
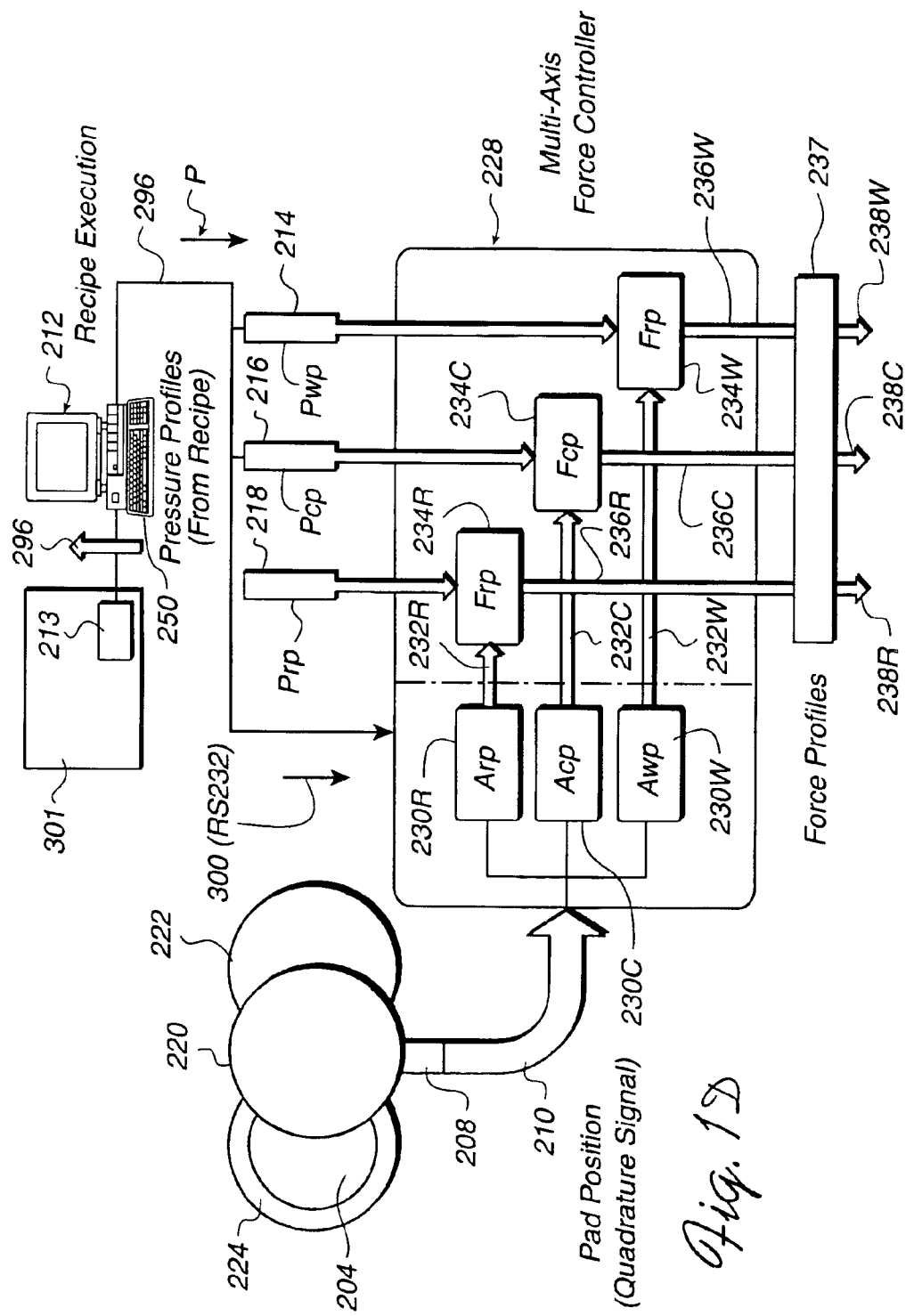
FIG. 1D is a schematic view of a system of the preferred embodiment of the present invention, wherein a first processor provides first inputs to a second processor, the first inputs representing the position of the polishing pad relative to the wafer, and the second processor being shown receiving second inputs representing the pressure to be applied by the polishing pad on the wafer.

Referring to FIGS. 1A–1D, there is schematically shown a preferred embodiment of the present invention, including a system 200 having a resolution enhancement feature for improving the accuracy of conversion of required chemical mechanical polishing (CMP) pressure P to force F to be applied by a CMP head 202 to a wafer 204, for example. Generally, the system 200 may use an encoder 208 (FIG. 1D), to provide encoder signals 210 indicating the position of the CMP head 202 relative to the wafer 204. The system 200 may also use a processor 212, such as a personal computer, to process a recipe 213 that specifies the operations of the system 200 for required processing of the wafer 204, e.g., for CMP operations. The processor 212 may be a personal computer having a rated processing capacity of a 600 MHz Pentium™ series processor, or equivalent., and running under an NT O/S and under a visual logic controller program (VLC) sold by Steeplechase, for example. The processor 212 may output separate signals 214, 216, and 218 representing individual required pressures P that are required to be applied by a polishing, or planarization, pad 220. For example, signals 214 represent values of one such pressure Pwp to be applied by the pad 220 on the wafer 204. Signals 216 represent values of another such pressure Pcp to be applied by the pad 220 on a conditioner puck 222. Signals 218 represent values of the other such pressure Pwp to be applied by the pad 220 on a retainer ring 224. Use of the letter "P" refers generally to such required pressures, and is shown in FIG. 1D. Reference to a specific one of the required pressures P is indicated by the use of Pwp, Pcp, or Prp. The term "Pressure Profiles" shown in FIG. 1D indicates that the recipe 213 may specify that the value of any such pressure P is to be constant, or that such value is to vary over time.

To illustrate the present invention, a situation is described in which the value of the pressure P is to be constant, and in which the head 202 and the pad 220 may move relative to each of the wafer 204, the puck 222, and the ring 224 (see arrow 226 in FIG. 1A). Of course, the pressure P may vary in the operation of the system 200. In the exemplary constant pressure situation, the relative motion results in changing values of areas AW (FIG. 1B), and AC and AR (shown in FIG. 1C) of overlap (or contact) of the pad 220 on (or with) the respective wafer 204, puck 222, and ring 224. The pressure P is in terms of the force F applied to an area A. With the values of the respective pressures Pwp, Pcp, and Prp maintained constant in this example, as the pad 220 moves in the directions of the arrow 226, the values of the respective forces Fwp, Fcp, and Frp applied to respective areas Awp, Acp, or Arp must change in proportion to the changes in the values of the respective area AW, AC, or AR. The term "Force Profiles" shown in FIG. 1D indicates that in response to the recipe 213 specifying a value of any such pressure P, the corresponding value of the force F (e.g., Frp, Fcp, or Fwp) may vary over time. The encoder signals 210 and the pressure signals 214, 216, and 218 are applied to a multi-axis force controller 228, wherein one axis is for the wafer 204, another axis is for the puck 222, and the other axis is for the ring 224. The force controller 228 may be a programmable signal processor (DSP) sold by Logosol, Inc. and having a per axis processing capacity of about that of a 486 series Intel ™ processor or equivalent. Such processor 228 has three axes, one corresponding to each of the three axes described above, such that the three axes may be processed at the same time.

The wafer axis of the controller 228 processes the encoder signal 210 in respective area processors 230W for the area Awp, 230C for the area Acp, and 230R for the area Arp. Respective signals 232W, 232C, and 232R represent the respective areas Awp, Acp, and Arp at a moment of time and corresponding to the particular relative position of the pad 220 and the respective wafer 204, puck 222 and ring 224. The respective signals 232W, 232C, and 232R are applied to respective force processors 234W, 234C, and 234R which convert the respective pressure signals 214, 216, and 218 and the respective area signals 232W, 232C, and 232R to respective signals 236W, 236C, and 236R representing the respective forces Fwp, Fcp, and Frp in terms of force units such as pounds, for example. The signals 236W, 236C, and 236R are applied to an analog logic processor 237 having a section corresponding to each of the signals 236W, 236C and 236R. The respective sections of the analog logic processor 237 provide respective force signals 238W, 238C and 238R to respective force actuators 239W, 239C, and 239R (FIG. 1A) which urge the respective wafer 204, puck 222, and ring 224 toward the pad 220 to apply respective required pressure Pwp, Pcp, and Prp to the respective wafer 204, puck 222, and ring 224. As described above, the force actuators 239 may be of the high resolution type, such as linear electromagnetic actuators, rather than the low resolution pneumatic actuators noted above.

The processor 212, the force controller 228, and the analog logic processor 237 are configured to minimize, if not eliminate, the above-defined quantization error. In the context of the system 200, the above-defined term "quantization" refers to the below-described process of computation performed by the processor 212, the force controller 228, and the analog logic processor 237, in which computational resolution is of significant importance in obtaining the values of the respective forces Fwp, Fcp, and Frp computed results, each of which has an acceptable accuracy.

In a quantization process performed with respect to one of the axes, a parameter may be the required pressure P, such as the required pressure Pwp, for example. Other quantization processes may be performed with respect to the other two axes (puck and ring), and the parameters may be the respective required pressures Pcp and Prp having appropriate initial values. Using the required pressure Pwp as an example for purposes of description of all such required pressures Pwp, Pcp, and Prp, such exemplary pressure Pwp may have an initial value of 0.005 psi, for example. Such initial value of the exemplary required pressure parameter Pwp is subjected to the below-described computational operations in the processor 212, the force controller 228, and the analog logic processor 237 to obtain the computed result, which is the value of the force Fwp corresponding to the initial value of the pressure Pwp. Similar operations with respect to the other required pressures Pcp and Prp result in obtaining the value of the required respective forces Fcp and Frp as the respective computed results.

Such quantization process may be performed with minimum, or no, quantization error, as defined above, even though the system 200 includes digital devices such as the force controller 228, for example, having the relatively average component resolution defined below and even though the computations in the processor 212, the force controller 228, and the analog logic processor 237 are based on an average computational resolution. A preferred value of the selected component resolution is about six bits, and a more preferred value of the component resolution is about eight bits, and a most preferred value of the component resolution is from about ten to twelve bits. The components in the high end of this range are referred to as having a "relatively average" component resolution, which is in comparison to digital devices having high resolutions of from about fourteen bits to about 16 bits, for example. As described above with respect to component availability, digital devices having relatively average resolution are readily available, whereas as resolution increases such high resolution digital devices are less available.

The recipe 213 typically specifies a preferred range of required pressure P of from about zero psi to about ten psi. However, without the benefits of the present invention, the low end of the range is generally a pressure of about 1.5 psi. With the present invention, the range of the pressure P may start from about zero psi. The parameter resolution (as defined above) of the preferred pressure range is 0.001 psi, for example, which is to say that the required pressure Pwp is most preferrably specified in increments or steps of 0.001 psi.

With such parameter resolution and component resolution in mind, for comparative purposes the normal criteria described above may be used as follows to determine whether quantization error would normally result from the use of the selected relatively average component resolution of 10 bits (or 1024 counts), i.e., without the present invention. The exemplary absolute value of the parameter (pressure) increment is 0.001 psi. The absolute value of computational pressure range steps is determined by the pressure range of 10 psi divided by 1024 (i.e., about 0.01 psi per step). Thus, the absolute value of the parameter resolution increment is much less than the absolute value of the pressure range step. Based on the above normal criteria, one would expect significant quantization error to result because a choice of zero or 0.01 psi would be available as the steps closest to the required exemplary 0.005 psi pressure Pwp. Each of such steps of the choice would have an error of 0.005 psi, or 100%. However, as described below, such quantization error does not occur in the use of the present invention. Rather, with the ten or twelve bit component resolution of the described digital devices(e.g., the force controller 228) and the same computational resolution, no quantization error should result.

Figure 2:
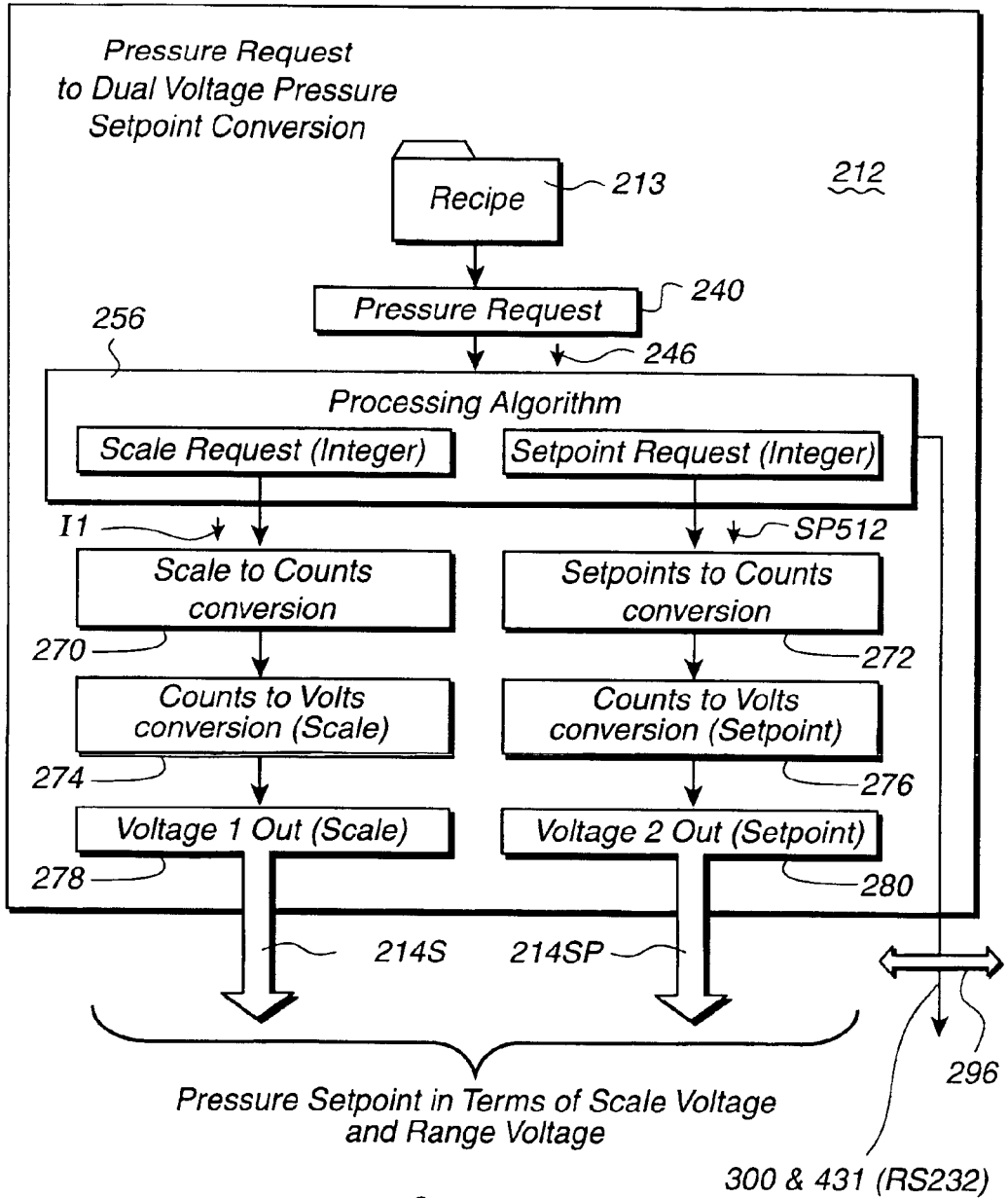
FIG. 2 is a schematic view of the first digital processor shown operating based on a recipe and specifying various required CMP pressures.
Figure 3:
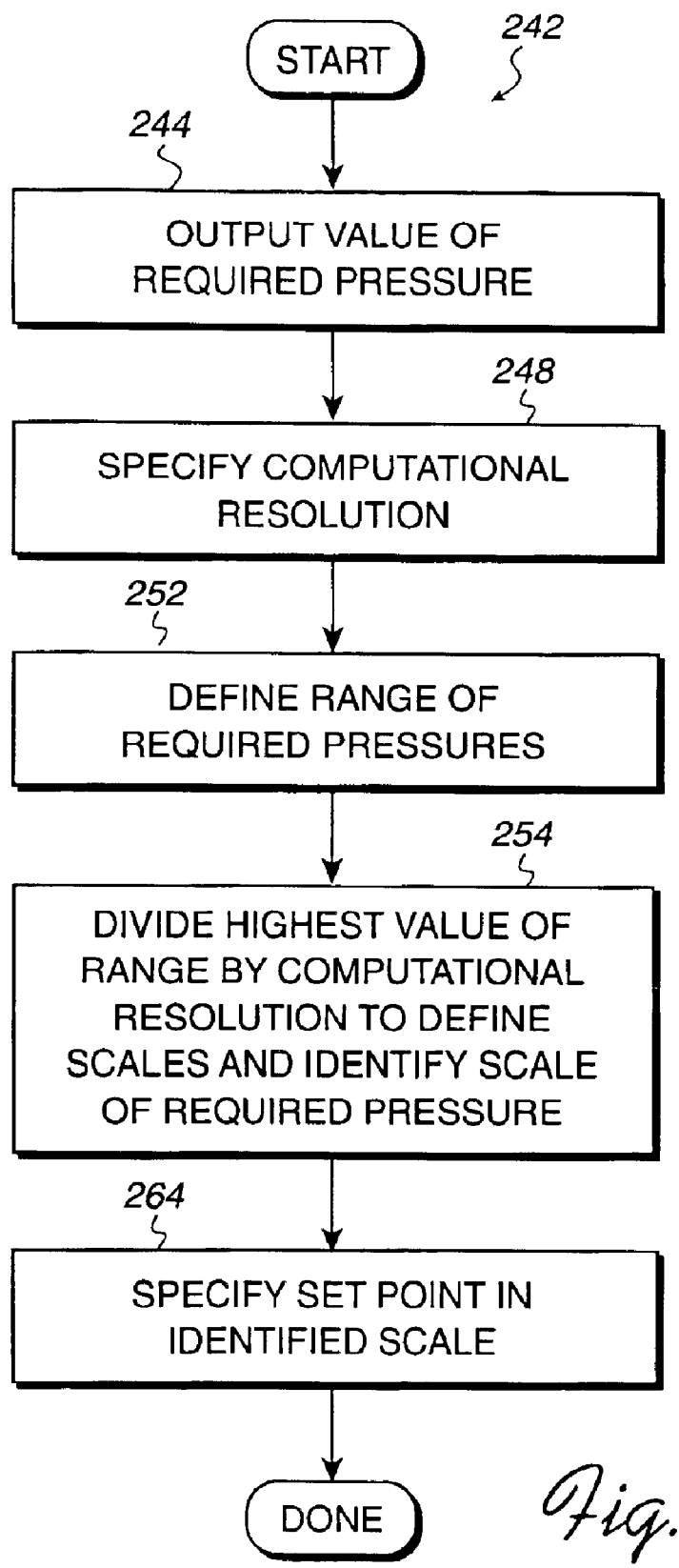
FIG. 3 depicts a flow chart illustrating operations of a method for specifying the required pressure in terms of a first scale identifier specifying a particular scale as the scale in which the required pressure is located, and a second identifier specifying a value of a set point within the specified one of the scales.
Figure 4:
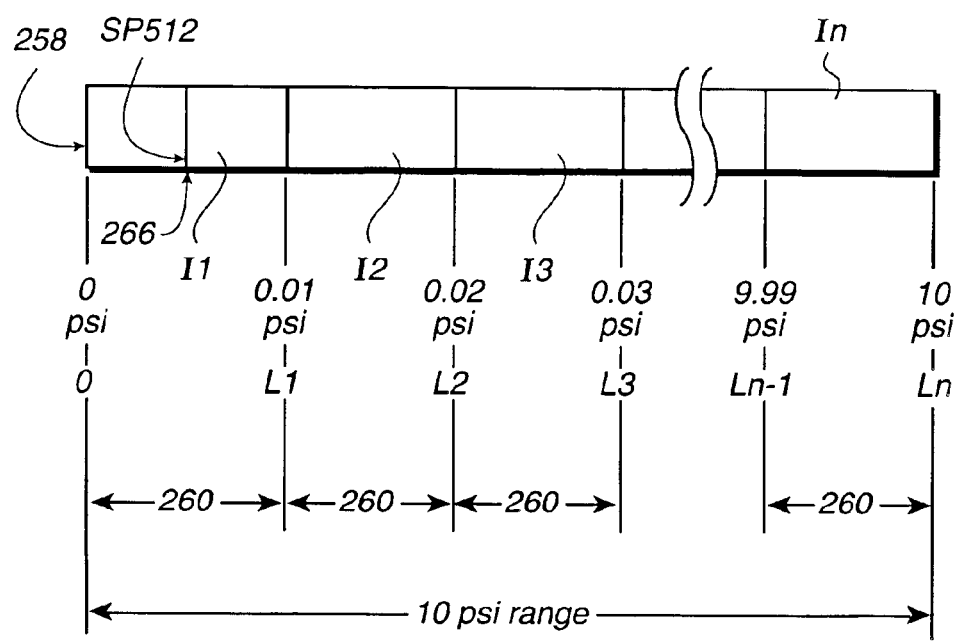
FIG. 4 is a schematic view illustrating the scales resulting from the method depicted in FIG. 3, and the set point in the specified one of the scales.

In FIG. 1D, the processor 212, the force controller 228, and the analog logic processor 237 are shown as separate units. To achieve the required minimization or elimination of the quantization error, the present invention includes a method of specifying the chemical mechanical polishing pressure P (the pressure profiles in FIG. 1D, for example). The method facilitates improvements in communicating the value of the exemplary required pressure Pwp from the processor 212 to the force controller 228, and from the force controller 228 to the analog logic processor 237, and to the force actuators 239. Referring to FIGS. 2 and 3, the processor 212 is programmed by an instruction 240. The method is defined by a flow chart 242 depicted in FIG. 3, and starts with an operation 244 implementing the instruction 240. Operation 244 outputs the exemplary required pressure Pwp (0.005 psi) as a pressure request 246. The method moves to an operation 248 for specifying the 10 bit computational resolution to be used in processing to obtain a computed value of the required pressure Pwp. The computed value is to have improved accuracy. In FIG. 1D a keyboard 250 or other input device is provided for performing operation 248. The method moves to an operation 252 for defining the set of values representing the range of possible required pressures Pwp. The set includes the required value (0.005 psi) of the exemplary pressure Pwp. The method moves to an operation 254 to implement instruction 256. Operation 254 divides the highest value (10 psi) of the exemplary range of possible required pressure Pwp by the value of the computational resolution (the exemplary 1024) to obtain a series of pressure scales 258. The pressure scales 258 may be identified by 0-L1, L1-L2, . . . (Ln-1)-Ln, as shown in FIG. 4, for example. The pressure scales 258 represent ranges 260 of uniformly increasing possible values of the exemplary pressure Pwp, where the ranges 260 have equal amounts of the required pressure Pwp. In the exemplary situation, each of the ranges 260 equals 0.01 psi. A different first scale identifier (e.g., "I1", "I2", . . . "In") is provided for each of the scales 258 of the exemplary range of pressure Pwp. A number (the exemplary 1024) of different first identifiers "In" is equal to the value of the computational resolution (the exemplary 1024). In the example, operation 254 results in the first scale identifier specifying scale I1 as the scale in which the required exemplary pressure Pwp is located.

The instructions 256 are further implemented as the method moves to an operation 264 for specifying the required value (the exemplary 0.005 psi) of the pressure Pwp by providing a different second identifier (SP) to indicate a value of a set point 266 within any specific one of the scales 258, e.g. scale I1. The set point 266 may correspond to any particular pressure value in the identified scale 258, e.g. 0.005 psi in scale I1. The number of different second identifiers SP (the exemplary 1024) is equal to the value of the computational resolution (the exemplary 1024 in the exemplary situation). The set point 266 corresponding to the pressure Pwp is identified by the second identifier SP512 in FIG. 4. In FIG. 3 the specifying of the exemplary CMP pressure Pwp is completed as operations 254 and 264 output the respective first and second identifiers I1 and SP512. It may be understood that the computational resolution is used to obtain each of the scale identifier and the set point identifier. In other words, each of the exemplary 1024 scales 258 is divided into the exemplary 1024 possible set points.

Figure 5:
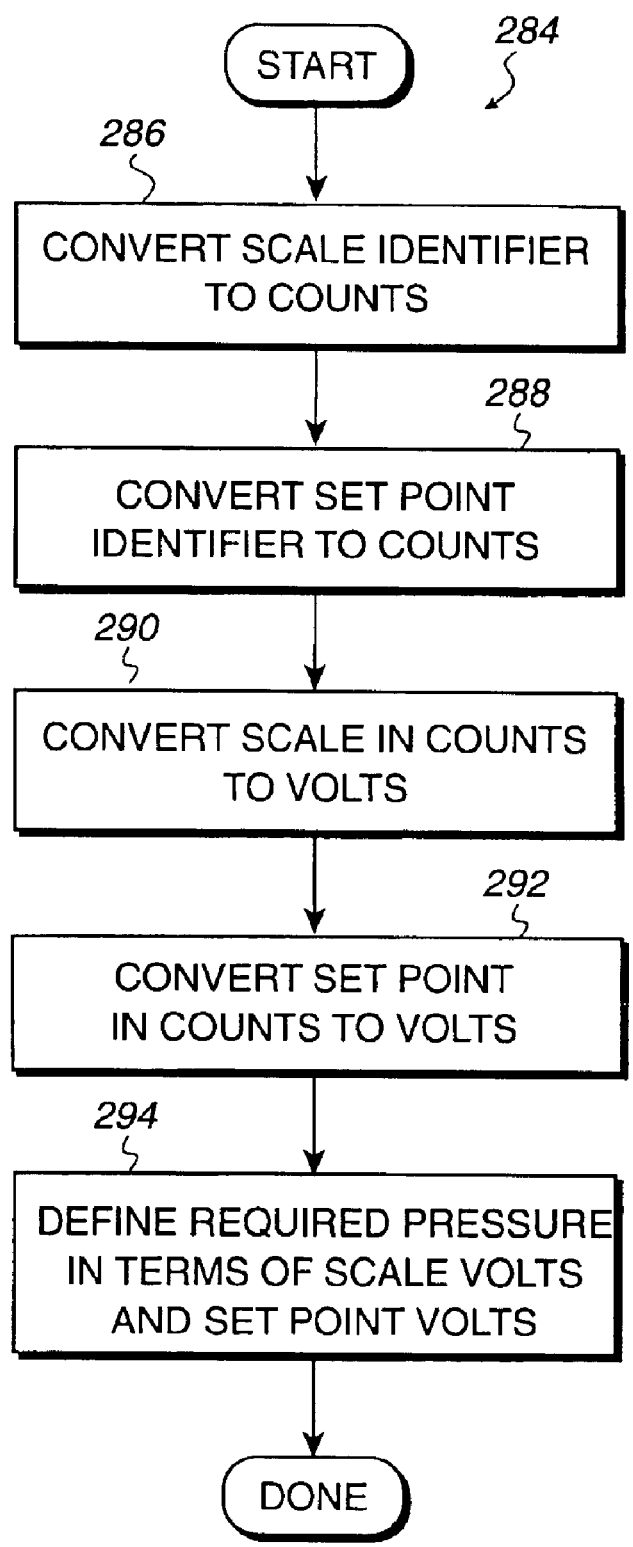
FIG. 5 depicts a flow chart illustrating operations of a further method performed in the first digital processor for providing scale and set point signals representing the required pressure to be applied to the wafer.

Referring to FIGS. 2 and 5, other instructions are processed by the processor 212, including instruction 270, 272, 274, 276, 278, and 280, which are implemented by operations of a flow chart 284 shown in FIG. 5 for communicating the specific required value of the exemplary pressure Pwp to the force controller 228 for more accurate processing of the required value of the exemplary pressure Pwp. Operation 286 implements a pressure scale-to-count conversion of instruction 270, by which the exemplary first identifier "In" is converted to a number of counts. For example, the exemplary identifier I1 representing the first scale 258 is represented by 1 count. The identifier In representing the last scale 258 would be represented by the exemplary 1024 counts corresponding to an appropriate value of the pressure Pwp. The method moves to operation 288 which implements a pressure set point-to-count conversion of instruction 272, by which the second identifier SP512 is converted to a number of counts. For example, the exemplary identifier SP512 representing the set point 266 is represented by 512 counts to correspond to the value of 0.005 psi which is one-half way between 0.00 psi and 0.01 psi. An exemplary identifier SP1024 would identify the last set point 266 and would be represented by 1024 counts. For efficiency of operation of the force actuators 239, the pressure scale-to-count conversion provides count values of between 0 and 1024 for the odd numbered pressure scales 258 (e.g., scales I1, I3, etc.) whereas the count values of the even numbered pressure scales 258 are between 1024 and 0.

The method moves to operations 290 and 292 which respectively implement instructions 274 and 276 to collectively generate one of the signals 214 when pressure Pwp is processed, or the respective signals 216 and 218 when the respective pressure Pcp or Prp are processed. Each such signal is in two parts. In the exemplary situation, one part represents the required value (0.005 psi) of the exemplary pressure Pwp in terms of a pressure scale part 214S, and a second part represents a pressure set point part 214SP. Operation 290 implements a pressure scale count-to-voltage conversion of instruction 274. The implementation in operation 290 again uses the computational resolution, by which the count value of the first identifier "I1" is converted to a voltage. The conversion is performed by selecting a value of a range of voltage of the output 214, such as 10 volts. The voltage range is divided by the computational resolution to obtain a value of a pressure scale data conversion function, which in the exemplary situation is 0.01 volts per count. The one count value of the first scale identifier I1 thus corresponds to a 0.01 volt value, which may be referred to as pressure scale volts and represents the value of the pressure scale part 214S of the two part signal 214.

The method moves to operation 292 that implements a pressure set point count-to-voltage conversion of instruction 276. The implementation in operation 292 again uses the computational resolution, by which the count value of the second identifier "SP512" is converted to a voltage. The above 10 volt value of the range of the signal 214 divided by the computational resolution provides a pressure set point data conversion function having a value of about 0.01 volts per count. The 512 count value of the second scale identifier SP512 thus corresponds to about a 5.0 volt value, which may be referred to as pressure set point volts and represents the value of the pressure set point part 214SP of the two part signal 214.

The method moves to operation 294 to implement instructions 278 and 280. The exemplary required pressure Pwp is defined in terms of the signal 214S (i.e., the 0.01 volt value of the pressure scale volts) and the signal 214SP (i.e., the 5.0 volt value of the pressure set point volts). The method is then done. As shown in FIG. 2, the signals 214S and 214SP are output from the processor 212, and are applied to the force controller 228 shown in FIG. 6A. The methods of flow charts 242 and 284 facilitate improved accuracy of communication of the value of the exemplary required pressure Pwp from the processor 212 to the force controller 228, in that, as described below, the exact value of the exemplary required pressure Pwp may be obtained in the force controller 228.

One aspect of the improved accuracy of communication of the value of the exemplary required pressure Pwp from the processor 212 to the force controller 228 is facilitated by defining synchronization, or pressure synchronization, data 300. This data 300 synchronizes the computational operations of the processor 212, which represents a first digital processor, and of the force processor 234W of the controller 228, which represents a second digital processor. The synchronization data 300 includes the data set forth in Table I:

TABLE I

SYNCHRONIZATION DATA 300

The computational resolution
The set of values representing the range of possible required pressures P
The definition of the pressure scales 258
The pressure scale data conversion function
The pressure set point data conversion function As described above, the operations in flow charts 242 and 284 are based on one or more items of the synchronization data 300. The processor 212 and the force controller 228 are provided with the synchronization data 300 from a hard drive 301, for example, via a bus 296. The data 300 is in the form of an RS232 signal applied to the force controller 228, for example. In general, based on one or more items of the synchronization data 300, the second digital processor (i.e., the force processor 234W, FIG. 1D) converts first and second digital data (e.g., the exemplary respective 0.01 volt signal 214S and the exemplary 5 volt signal 214SP) to one data item 302, which is a pressure request that ideally digitally represents the exact initial value (e.g., the exemplary 0.005 psi) of the parameter (the exemplary required pressure Pwp).

Figure 6B:
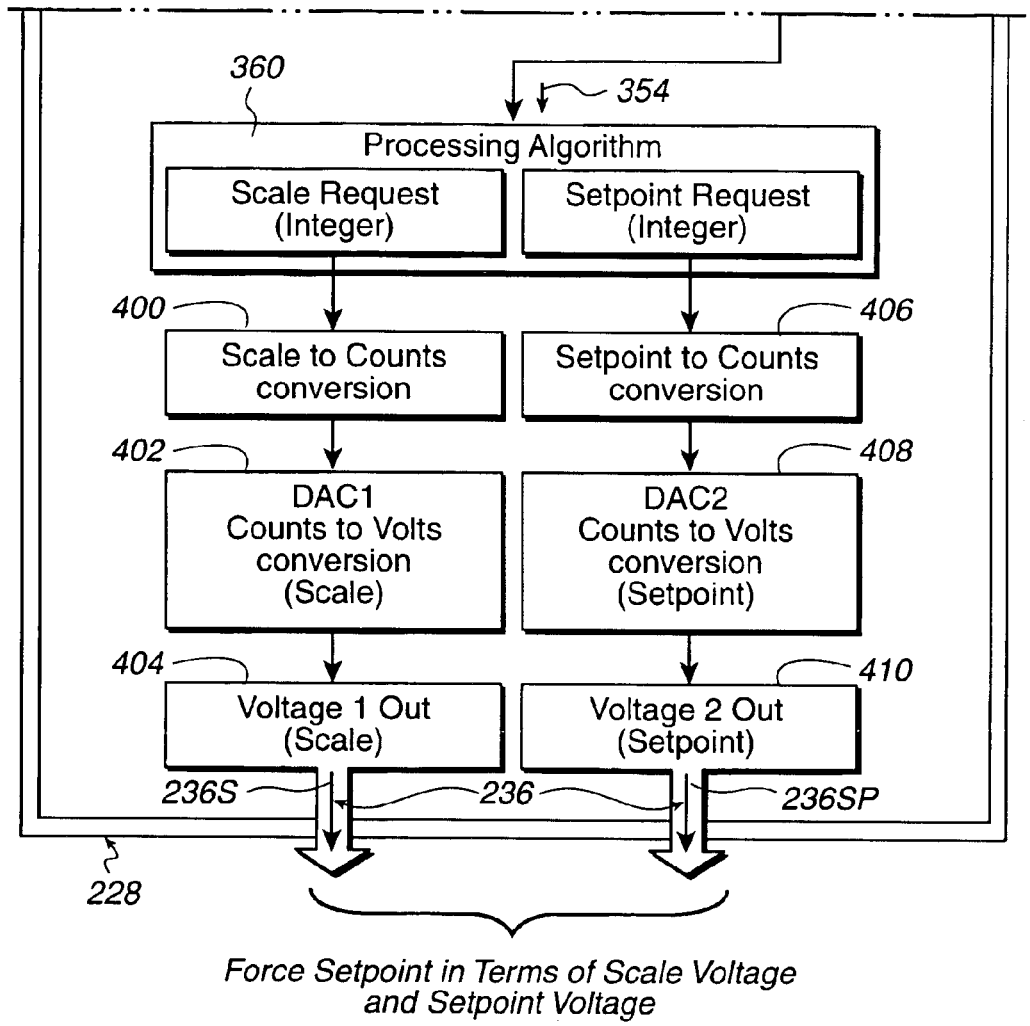
FIG. 6B is a schematic diagram of the second section of the second digital processor that converts pressure request data to a force request.
Figure 7:
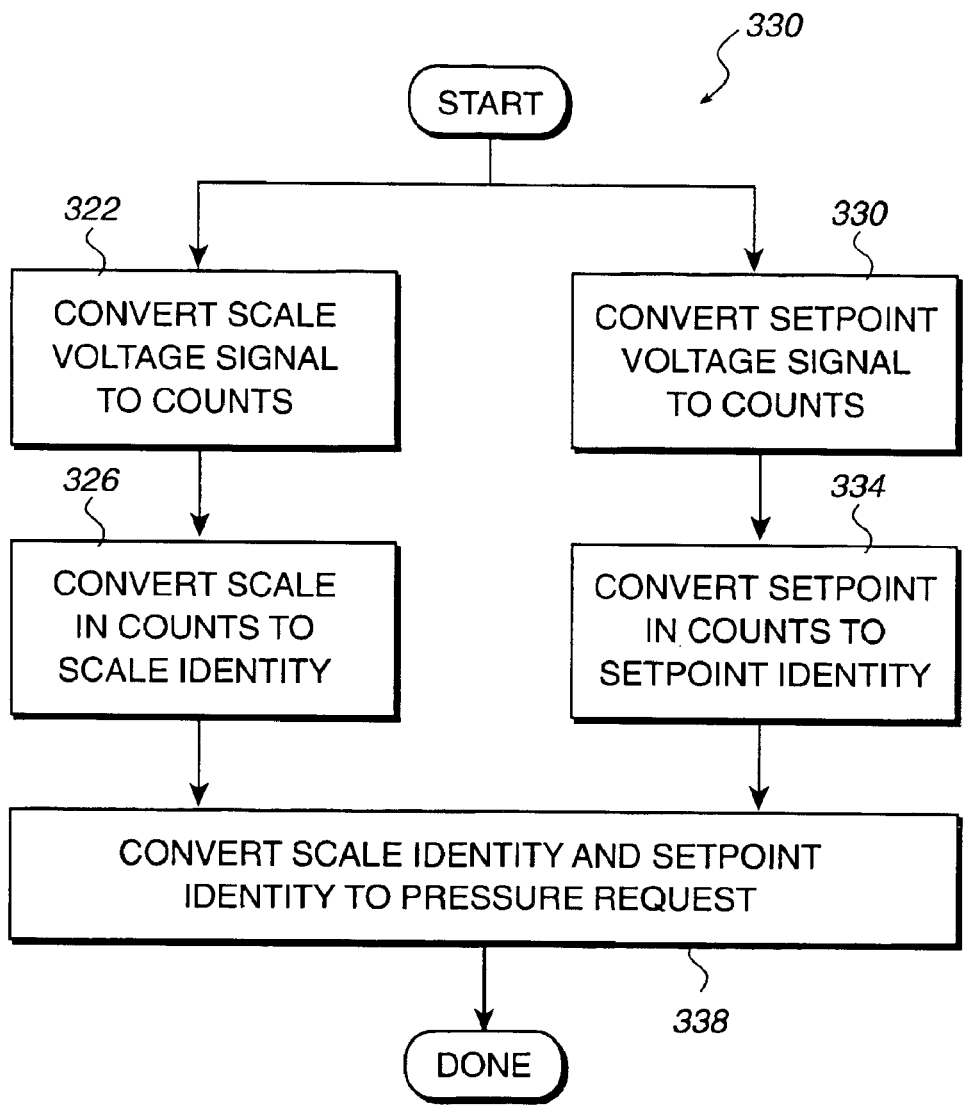
FIG. 7 depicts a flow chart illustrating operations performed by the second processor for processing a scale signal and a set point signal to define the pressure request.

In more detail, FIGS. 6A and 6B taken together show the force processor 234W as being provided with the synchronization data 300 (shown as the RS232 signal) from the hard drive 301 via the bus 296. The force processor 234W includes instructions 304, 306, and 308 for processing the signal 214S, and instructions 310, 312, and 308 for processing the signal 214SP. FIG. 7 shows a flow chart 320 depicting operations for processing the signal 214S. An operation 322 converts the value of the voltage of the pressure scale signal 214S to digital data 324 representing counts and having a value corresponding to the respective exemplary specified pressure scale I1, i.e., 1 count. In such conversion, operation 322 uses the pressure scale data conversion function of the synchronization data 300. The method moves to operation 326 in which instruction 306 is processed to convert the 1 count value of the digital data 324 to digital data 328 representing the one of the 1024 scales shown in FIG. 4. In such conversion, operation 326 uses the definition of the scales 258 of the synchronization data 300.

When the method moves to operation 322, the method also moves to operation 330 for converting the value of the voltage of the pressure set point signal 214SP to digital data 332 representing counts and having a value corresponding to the respective specified scale SP512, i.e., 512 counts. In such conversion, operation 330 uses the pressure set point data conversion function of the synchronization data 300. The method moves to operation 334 in which instruction 312 is processed to convert the 512 count value of the digital data 332 to digital data 336 representing the set point in scale I1 shown in FIG. 4. In such conversion, operation 326 uses the definition of the scales 258.

The method moves to operation 338 in which instruction 308 is processed to convert the exemplary pressure scale I1 identity represented by the digital data 328, and the pressure set point identity represented by the data 336. Conversion of the pressure scale I1 results in an identification of value of the range (zero to 0.01 psi) of the one of the 1024 scales described in FIG. 4 that includes the exemplary pressure Pwp. Conversion of the set point SP512 results in identifying the exact value of the exemplary required pressure Pwp, i.e., 0.005 psi. In such conversion, operation 338 uses the definition of the pressure scales 258 of the synchronization data 300. Digital data 340 representing the value (the exemplary 0.005 psi) of the required pressure Pwp is output as the pressure request 302.

Reference to FIGS. 2, 6A and 6B indicates that the above-described use of the pressure synchronization data 300 in the force processor 234W, the selection of the relatively average computational resolution, and the dividing of such computational resolution into both the pressure range of the exemplary required pressure Pwp and the voltage range of the output signals 214, facilitates the improved accuracy of the communication of the value of the exemplary required pressure Pwp from the processor 212 to the force processor 234W.

Figure 8:
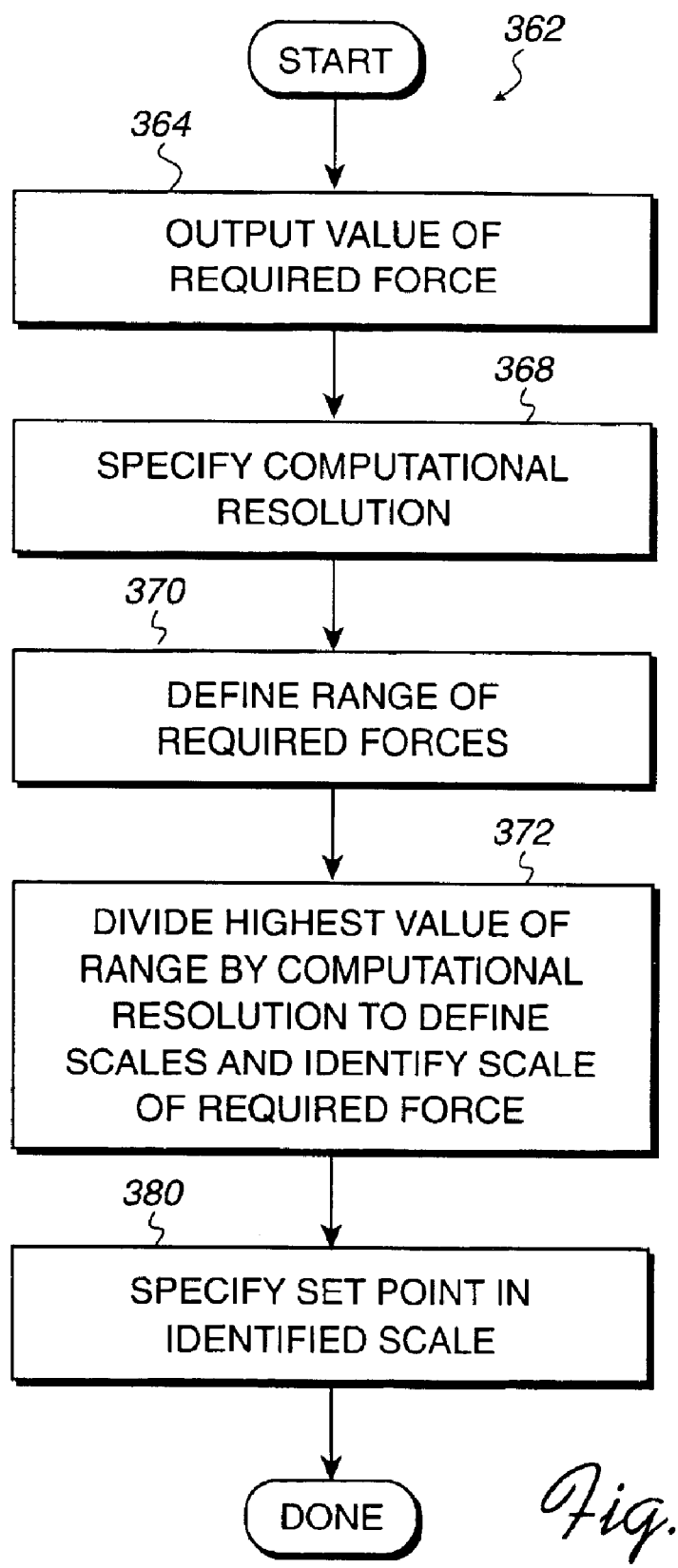
FIG. 8 depicts a flow chart illustrating further operations performed by the second processor for defining the required force in terms of a first scale identifier specifying a particular scale as the scale in which the required force is located, and a second identifier specifying a value of a set point within the specified one of the scales.

As described above, the encoder signals 210 and the pressure signals 214, 216, and 218 are applied to the force processor 234W of the multi-axis force controller 228. The force controller 228 may be a programmable signal processor (DSP) sold by Logosol, Inc. and having a per axis processing capacity of about that of a 486 series Intel™ processor or equivalent. This DSP processor 228 has three axes, which means that the three axes (each of the wafer 208, the ring 226 and the puck 222) may be processed at the same time. FIGS. 6A and 6B taken together show the details of the force processor 234W for the one wafer axis. FIGS. 7 and 8 show operations of methods performed by the force processor 234W. The details for the two other axes and the method operations for such axes are similar to those shown in FIGS. 6A, 6B, 7 and 8.

The wafer axis of the processor 234W shown in FIGS. 6A and 6B processes the encoder signal 210 in the area processor 230W to define the area Awp at a moment of time and corresponding to the particular relative position of the pad 220 and the respective wafer 204. It is understood that the resolution of the encoder 208 is high enough as to induce only small errors in such defining of the areas A. This processing is described in the Prior Application, and results in the signal 232W being applied to the force processor 234W of the force controller 228. FIGS. 6A and 6B show the pressure request 302 and the area signal 232W input to a force calculation instruction 350. The instruction 350 is processed as also described in the Prior Application, and results in a force request 352. The force request 352 may be in terms of digital data 354 representing the force in force units such as pounds corresponding to the exemplary required pressure Pwp to be applied to the exemplary area Awp.

To achieve the required minimization or elimination of the quantization error, the present invention further includes a method of specifying the CMP force F (the force profiles in FIG. 1D, for example). The method facilitates improvements in communicating the value of the exemplary force Fwp (corresponding to the required pressure Pwp) from the force controller 228 to the analog logic preprocessor 237PP shown in FIG. 11. Referring to FIGS. 6A, 6B, 8 and 9, the force processor 234W is programmed by instructions 360. The method is defined by a flow chart 362, and starts with an operation 364. Operation 364 outputs an exemplary required force Fwp (7.5 pounds) representing the force request 352. The method moves to an operation 368 for specifying a computational resolution (e.g., the average 10 or 12 bit computational resolution) to be used in processing to obtain a computed value of the force Fwp. The computational resolution (e.g., 10 bits) is read from the pressure synchronization data 300 stored in the drive 301. The method moves to an operation 370 for defining the set of values representing the range of possible required force. The set includes the required value (exemplary 7.5 pounds) of an exemplary force Fwp. Processing of forces Fcp and Frp is performed in a manner similar to that described below with respect to the force Fwp.

Figure 9:
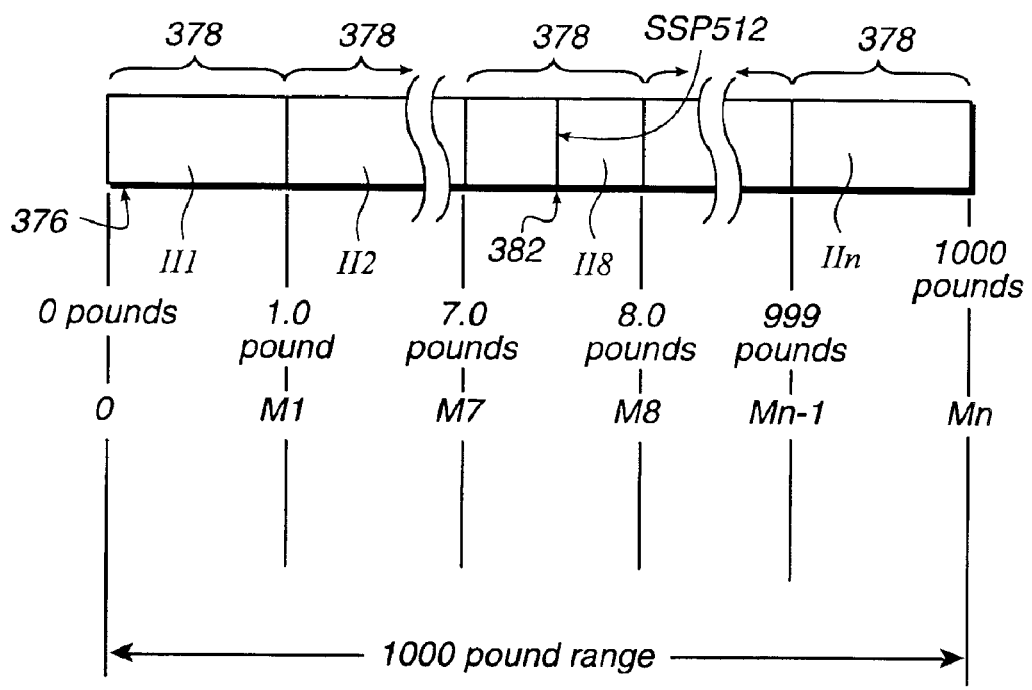
FIG. 9 is a schematic diagram depicting a set of force scales and a force set point within an identified force scale to represent a required force.

The method moves to an operation 372 to further implement the instruction 360. Operation 372 divides the highest value (about 1000 pounds) of the exemplary range of possible required force Fwp by the value of the computational resolution (the exemplary 1024) to obtain a series of force scales 376. The force scales 376 may be identified by 0-M1, M1-M2, . . . (Mn-1)-Mn, as shown in FIG. 9, for example. The force scales 376 represent ranges 378 of uniformly increasing possible values of the exemplary force Fwp, where the ranges 378 have equal amounts of force. In the exemplary situation, each of the ranges 378 equals about 1 pound. A different first scale identifier (e.g.,"II1", "II2", –"IIn") is provided for each of the force scales 376 of the exemplary force Fwp, and a number (the exemplary 1024) of different first identifiers "IIn" is equal to the value of the computational resolution (the exemplary 1024). In the example, operation 372 results in the first scale identifier specifying scale 118 as the force scale in which the exemplary required force Fwp is located.

The instructions 360 are further implemented as the method moves to an operation 380 for specifying the required value (the exemplary 7.5 pounds) of the force Fwp by providing a different second identifier (SSP) to indicate a value of a set point 382 within any specific one of the scales 376, e.g. the exemplary force scale 118. The force set point 382 may correspond to any particular force value in the identified force scale 376, e.g. the exemplary 7.5 pounds in scale II8. The number of different second identifiers SSP (the exemplary 1024) is equal to the value of the computational resolution (1024 in the exemplary situation). The force set point 382 corresponding to the force Fwp is identified by the second identifier SSP512 in FIG. 9. In FIG. 8 the specifying of the exemplary CMP force Fwp is completed as operations 372 and 380 output the respective first and second identifiers II8 and SSP512.

Figure 10:
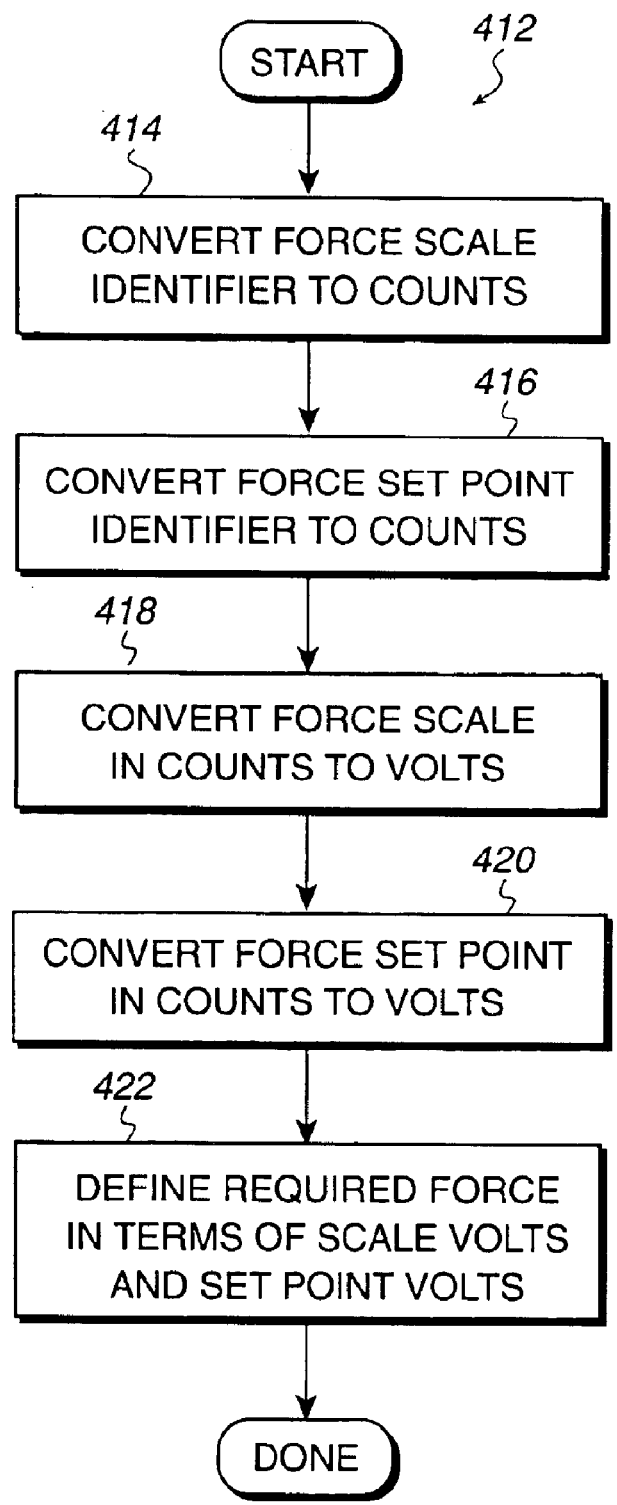
FIG. 10 depicts a flow chart illustrating operations performed by the second digital processor for converting the force scale and force set point to define the required force in terms of force scale volts and force set point volts.

Referring to FIGS. 6A, 6B, and 10, other instructions are processed by the force processor 234W, including instructions 400, 402, 404, 406, 408, and 410 which are implemented by operations of a flow chart 412 for communicating the specific required value of the exemplary force Fwp to the analog logic preprocessor 237PP for more accurate processing of the required value of the exemplary force Fwp. The analog logic preprocessor 237PP may be a programmable signal processor (DSP) sold by Logosol, Inc. and having a per axis processing capacity of about that of a 486 series Intel™ processor or equivalent, similar to that used for the force controller 228. In FIG. 10 operation 414 is shown for implementing a force scale identifier-to-count conversion of instruction 400, by which the first identifier "IIn" is converted to a number of counts. For example, the exemplary identifier II8 representing the eighth force scale 376 is represented by 8 counts; and the exemplary identifier II1000 representing the last force scale 376 is represented by the exemplary 1024 counts. The method moves to operation 416 which implements a force set point identifier-to-count conversion of instruction 406, by which the second identifier SSP is converted to a number of counts. For example, the exemplary identifier SSP512 representing the set point 382 is represented by 512 counts to correspond to the value of 7.5 pounds being one-half way between 7.0 pounds and 8.0 pounds. For efficiency of operation of the force actuators 239, the scale-to-count conversion provides count values of between 0 and 1024 for the odd numbered force scales 376 (e.g., scales I1, I3, etc.) whereas the count values of the even numbered force scales 376 are between 1024 and 0.

The method moves to operations 418 and 420 which respectively implement instructions 402 and 408 to collectively generate one of the signals 236W, 236C, and 236R in the form of two parts. In the exemplary situation relating to signal 236W, one part represents the required exemplary value (7.5 pounds) of the exemplary force Fwp in terms of a force scale part 236S and a force set point part 236SP. In more detail, the method moves to operation 418 which implements a force scale count-to-voltage conversion of instruction 402. The implementation in operation 418 again uses the computational resolution, by which the count value of the first identifier "IIn" is converted to a voltage. The conversion is performed by selecting a value of a range of voltage of the output 236W, such as 10 volts. The voltage range is divided by the computational resolution to obtain a value of a force scale data conversion function, which in the exemplary situation is 0.01 volts per count. The eight count value of the first scale identifier II1 thus corresponds to a 0.08 volt value, which may be referred to as force scale volts and represents the value of the force scale part 236S of the two part signal 236.

The method moves to operation 420 that implements a force set point count-to-voltage conversion of instruction 408. The implementation in operation 420 again uses the computational resolution, by which the count value of the second identifier "SSP512" is converted to a voltage. The above exemplary 10 volt value of the range of the signal 236SP divided by the computational resolution provides a force set point data conversion function having a value of 0.01 volts per count. The 512 count value of the second scale identifier SSP512 thus corresponds to a 5.0 volt value, which may be referred to as force scale volts and represents the value of the force set point part 236SP of the two part signal 236.

Figure 11:
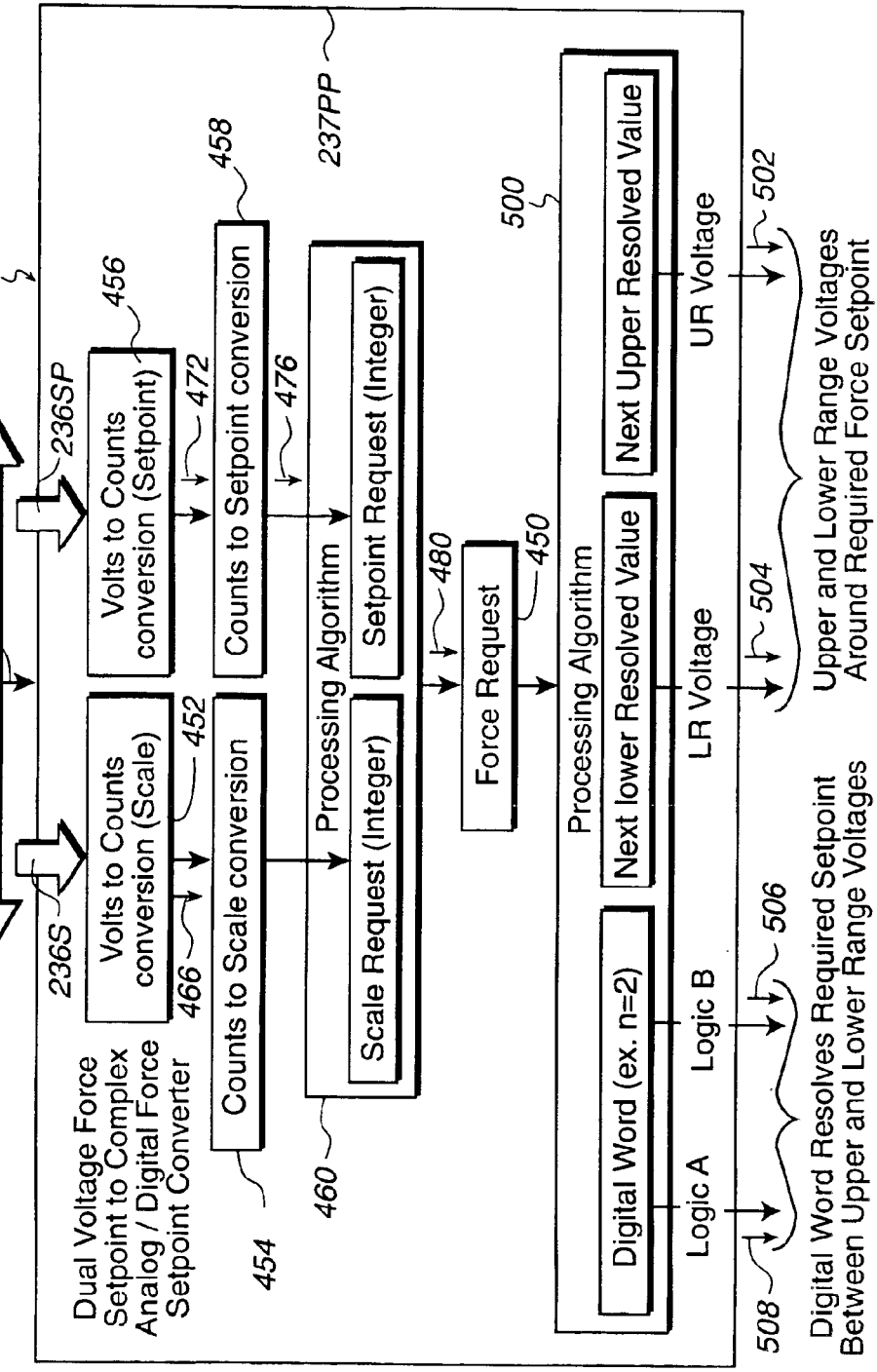
FIG. 11 is a schematic diagram of an analog logic preprocessor that receives data in terms of the force scale volts and force set point volts.

The method moves to operation 422 in which the exemplary required force Fwp is defined in terms of the signal 236S (i.e., the 0.08 volt value of the force scale volts) and the signal 236SP (i.e., the 5.0 volt value of the scale volts). The method is then done. As shown in FIGS. 6B and 11, the signals 236S and 236SP are communicated from the force controller 228 to the analog logic preprocessor 237PP. The methods of flow charts 362 and 412 facilitate improved accuracy of communication of the value of the exemplary required force Fwp from the force processor 234W to the analog logic preprocessor 237PP, in that, as described below, the exact value of the exemplary required force Fwp may be obtained in the analog logic preprocessor 237PP.

Consistent with the use of the pressure synchronization data 300 for communications between the processor 212 and the force processor 234W, communications between the force processor 234W and the analog logic preprocessor 237PP are synchronized by analog synchronization data 431 described below. This data 431 synchronizes the computational operations of the force processor 234W, which represents a first digital processor, and of the analog logic preprocessor 237PP, which represents a second digital processor. FIGS. 6A and 6B show the force processor 234W as being provided with the analog synchronization data 431 from the hard drive 301 via the bus 296 in the form of the RS232 signal. The analog synchronization data 431 includes the data set forth in Table II:

TABLE II

ANALOG SYNCHRONIZATION DATA 431

Figure 12:
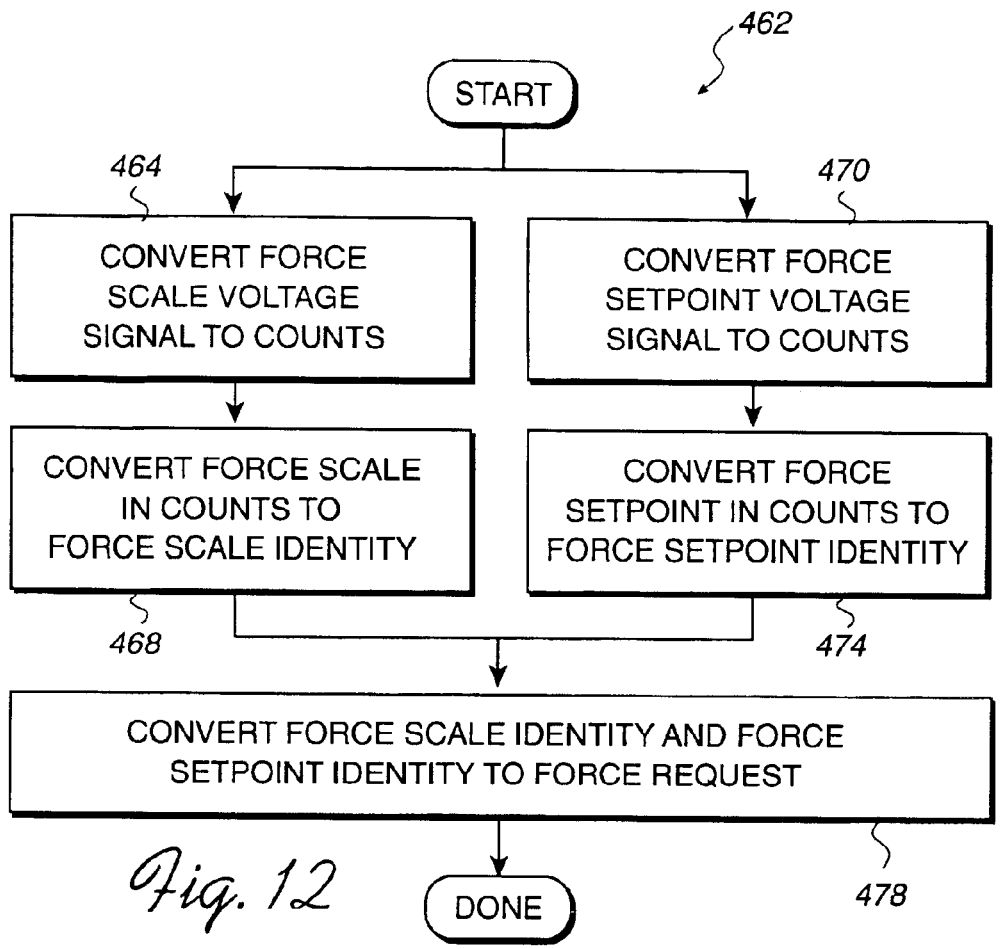
FIG. 12 depicts a flow chart illustrating operations performed by the analog logic preprocessor for converting the data in terms of force scale volts and force set point volts to define a force request.

The computational resolution
The set of values representing the range of possible required force F
The definition of the force scales 376
The force scale data conversion function
The force set point data conversion function As described above, the operations in flow charts 362 and 412 are based on one or more items of the analog synchronization data 431. Similarly, in general, based on one or more items of the analog synchronization data 431, if the force processor 234W is considered a first digital processor, then a second digital processor in the form of the analog logic preprocessor 237PP converts first and second digital data (the exemplary respective 0.08 volt signal 236S and the exemplary 5 volt signal 236SP) to one data item, which is a force request 450 (FIG. 11) that ideally digitally represents the exact initial value (7.5 pounds) of a parameter (the exemplary required force Fwp). In more detail, FIG. 11 shows the analog logic preprocessor 237PP as being provided with the analog synchronization data 431 (in the form of the RS232 signal) from a hard drive 432 via the bus 430. FIG. 11 also shows the analog logic preprocessor 237PP as including instructions 452 and 454 for processing the force scale signal 236S, and instructions 456 and 458 for processing the signal 236; along with instructions 460. FIG. 12 shows a flow chart 462 depicting operations for processing the signal 236S. An operation 464 converts the value of the voltage of the force scale signal 236S to digital data 466 representing counts and having a value corresponding to the respective exemplary specified force scale II8, i.e., 8 counts. In such conversion, operation 464 uses the force scale data conversion function of the analog synchronization data 431. The method moves to operation 468 in which instruction 454 is processed to convert the exemplary 8 count value of the digital data 466 to digital data 470 representing the one of the 1024 scales 376 identified as the exemplary force scale II8 in FIG. 9. In such conversion, operation 468 uses the definition of the scales 376 of the analog synchronization data 431.

When the method moves to operation 464, the method also moves to operation 470 for converting the value of the voltage of the signal 236SP to digital data 472 representing counts and having a value corresponding to the respective specified scale SSP512, i.e., 512 counts. In such conversion, operation 470 uses the force set point data conversion function of the synchronization data 431. The method moves to operation 474 in which instruction 458 is processed to convert the 512 count value of the digital data 472 to digital data 476 representing the force set point in scale II8 shown in FIG. 9. In such conversion, operation 474 uses the definition of the force scale 376.

The method moves to operation 478 in which instruction 460 is processed to convert the force scale II8 identity represented by the digital data 470, and the force set point identity represented by the data 476 to an identification of the value of the range (7.0 to 8.0 pounds) of the one force scale 376 shown in FIG. 9 that includes the exemplary force Fwp. Conversion of the force set point SSP512 results in identifying the exact value of the exemplary required force Fwp, i.e., 7.5 pounds. In such conversion, operation 478 uses the definition of the force scales 376 of the analog synchronization data 431. Digital data 480 representing the exemplary required force Fwp is output as the pressure request 450.

Reference to FIGS. 6A, 6B, and 11 indicates that the above-described use of the analog synchronization data 431 in the analog logic preprocessor 237PP, the selection of the relatively average computational resolution, and the dividing of such computational resolution into both the force range of the exemplary required force Fwp and the voltage range of the output signals 236S and 236SP, facilitates the improved accuracy of the communication of the value of the exemplary required force Fwp from the force processor 234W to the analog logic preprocessor 237PP.

Figure 13:
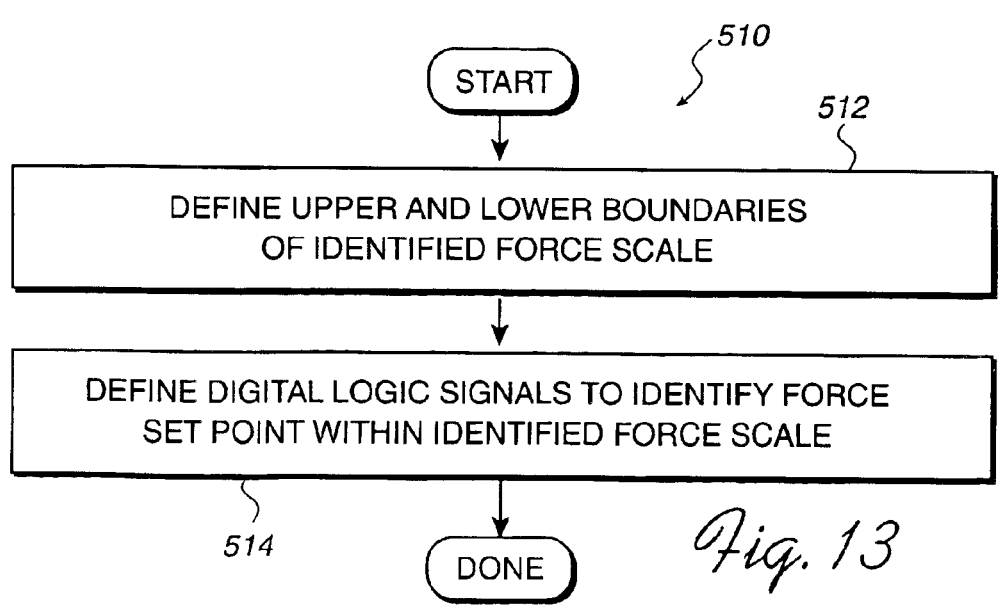
FIG. 13 depicts a flow chart illustrating further operations performed by the analog logic preprocessor for defining logic and force range signals for input to an analog logic processor.

FIG. 11 further shows that the analog logic preprocessor 237PP is also provided with instructions 500 for converting the force request 450 into an analog upper range signal 502 and an analog lower range signal 504, and to two digital logic signals 506 and 508. The instructions 500 are implemented by a method depicted by a flow chart 510 shown in FIG. 13. An operation 512 uses the force scale 376 and the exemplary force identifier II8 to cause the signals 502 and 504 to define, or represent, the respective upper and lower boundaries, or range, of the one force scale 376 identified by the exemplary identifier II8. Thus, the signal 502 represents 8 volts and the signal 504 represents 7 volts in the exemplary situation in which the exemplary required force F is to be 7.5 pounds. The method moves to operation 514 which defines digital logic for identifying the set point 382 within the identified force scale 376, and the method is done. The digital logic is based on the computational resolution (e.g., 10 bits in the exemplary situation).

Figure 14:
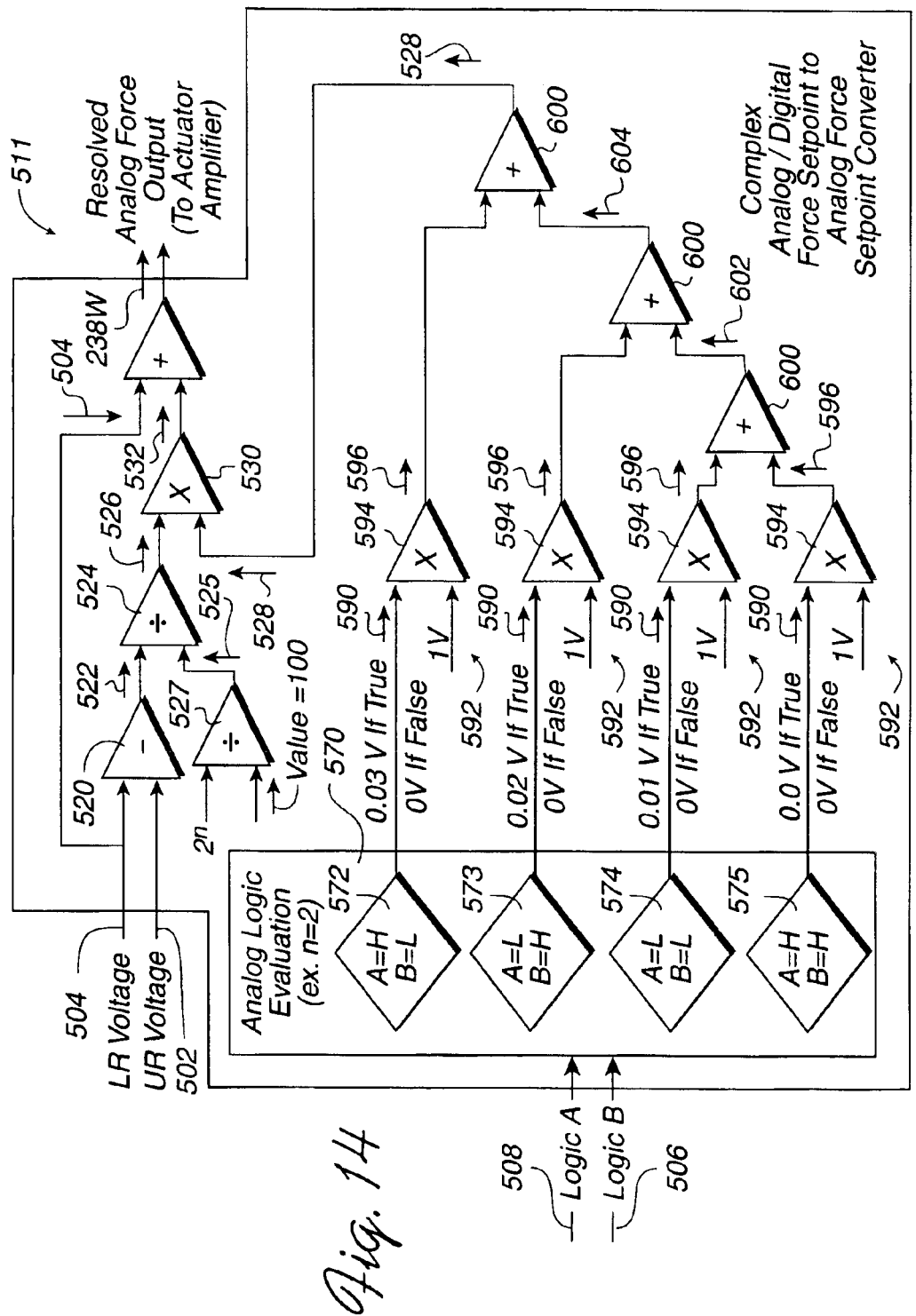
FIG. 14 is a schematic diagram of the analog processor which outputs the required force in terms of one analog voltage to be applied to a force actuator.
Figure 15:
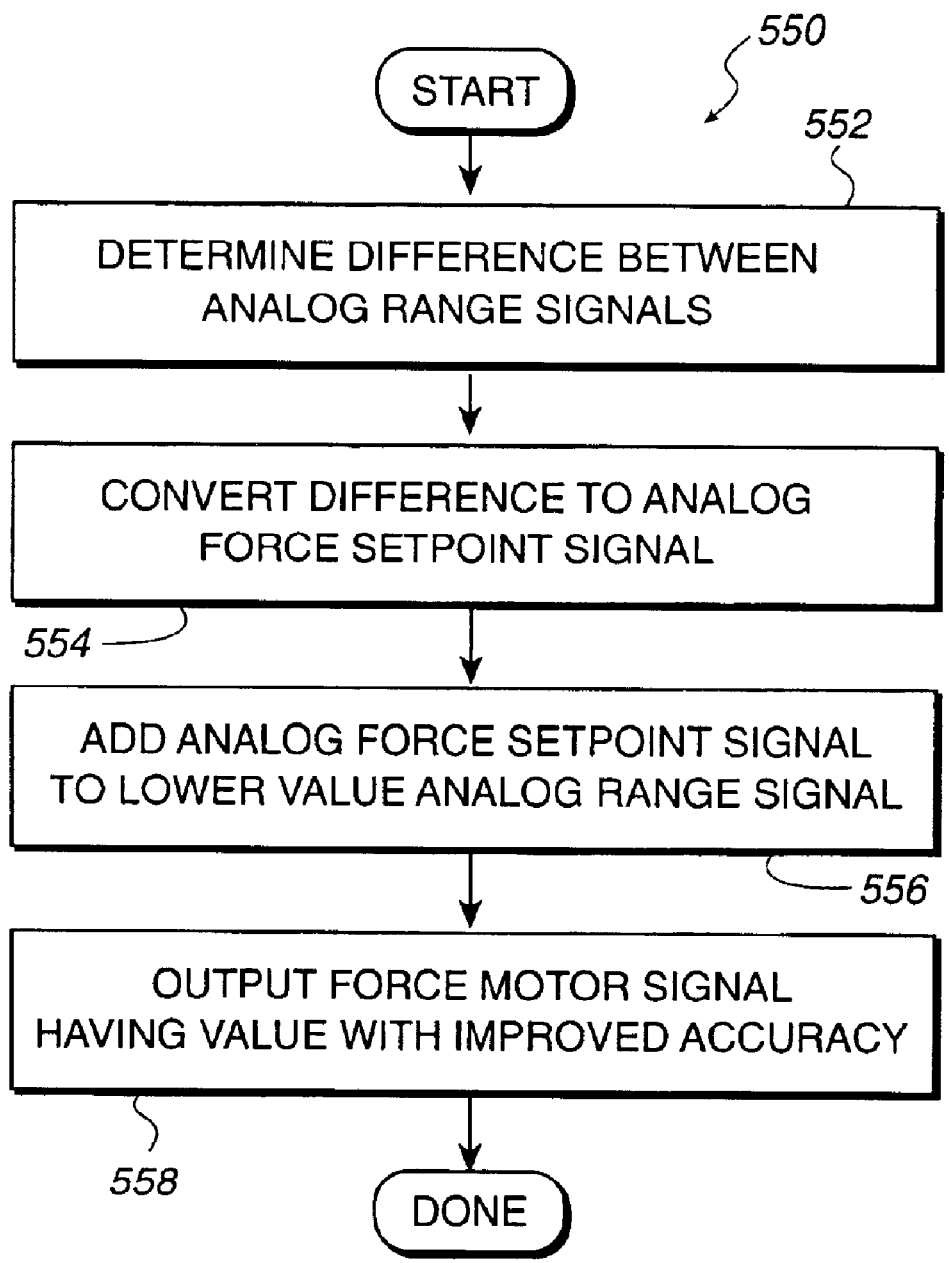
FIG. 15 depicts a flow chart illustrating operations performed by the analog logic processor for defining the value of the one analog voltage to be applied to the force actuator.

For ease of description, FIG. 14 primarily shows an example of 2 bit logic of the signals 506 and 508, and the following description refers to how the 2 bit logic and the 10 bit logic are implemented. FIG. 14 schematically depicts analog circuitry 511 for converting the four input signals 502, 504, 506, and 508 to one of the analog signals 238, in this case the exemplary analog signal 238W shown in FIG. 1D. A method of operation of the circuitry 511 is shown on FIG. 15 which depicts a flow chart 550. In an operation 552 the range signals 502 and 504 are applied to a subtractor circuit 520 to generate an analog range-of-force signal 522 representing the difference between the values of the signals 502 and 504. In the exemplary situation, the value of the difference is 1 volt, which is the value of the analog range-of-force signal 522. Based on the resolution of the digital logic signals 506 and 508, which in the example of FIG. 14 is 2 bits, in an operation 554 a divider circuit 524 converts the value of the analog range-of-force signal 522 (i.e., the difference between the two analog force signals 502 and 504) to an analog force increment signal 526, representing a value of 0.25 volts in the exemplary situation. The resolution (e.g., 2 bit) input to the divider circuit 524 may, for example, be from the drive 432 and is based on the analog synchronization data 431. An input to the divider 524 is provided by a divider 527. The divider 527 reduces the value of the signals 502 and 504 according to the range of the analog signals 238. For example, in the 2 bit situation 2 bits (2×2) is divided by 1; or in the 4 bit situation, 16 is divided by 2; and in the 10 bit situation 1024 is divided by 100 (which is the exemplary value shown in FIG. 14).

Based on the logic defined by the two digital logic signals 506 and 508 via an analog logic signal 528, a multiplier circuit 530 converts the value of the analog force increment signal 526 (the exemplary 0.25 volts) to an analog force set point signal 532. In the exemplary situation the value of the signal 532 is 0.5 volts (0.25 times the value 2 of the analog logic signal 528). FIG. 14 shows, and operation 556 describes, one of the analog force signals 502 and 504 (e. g., the lower signal 504) added to the analog force set point signal 532 to determine the value (in this example, 7.5 volts) of the force actuator signal 238W. In operation 558 the force actuator signal 238W is output and has the improved accuracy.

It may be understood that with the 2 bit logic shown by example in FIG. 14, only two logic input signals 506 and 508 are used (e.g., logic A and B). When the noted 10 bit logic is used for the logic signals, such as 506 and 508, etc., ten such logic signals are used (e.g., logic A–J). The circuitry for the 10 bit logic will be understood by first referring to the 2 bit logic shown in FIG. 14. An analog analysis circuit 570 receives the respective A and B logic signals 506 and 508. The circuit 570 may be a programmable signal processor (DSP) sold by Logosol, Inc. With the 2 bit logic, two times two, or four, possible logic states 572–575 may be provided by the two logic input signals 506 and 508. In the 10 bit case, 1024 logic states are achievable with 10 bit logic signals corresponding to logic A through logic J. In the 2 bit example, one of the logic states 572–575 outputs a logic signal 590 for any given logic input collectively defined by the signals 506 and 508. Each logic signal 590 is accompanied by a multiplier input 592 having a one volt value. The value of the signals 590 is selected according to the required values of the analog force set point signals 532. Generally, the values of the logic signals 590 are within the range of a 24 volt power supply. Thus, in the 10 bit example, the values of the logic signals 590 may range from 0.0 volts to about 10.0 volts (in the exemplary 0.01 volt increments shown in FIG. 14). In the 2 bit example, the signals 590 would be in a range of 0.0 volts to 3 volts, for example, in 1.0 volt increments, such that one exemplary signal 596 could have a 2 volt value.

The value of the signals 532 in turn depends on the values of the signals 526 and 528. The corresponding multiplier input 592 and logic signal 590 are input to a respective corresponding multiplier 594. For any given logic input to the analog logic evaluation circuit 570, only one multiplier 594 outputs a product signal 596 having a value other than zero. The product signals 596 are added as shown by staged adders 600 to provide a series of sum signals 602, 604, and 528. The value of the last sum signal is the value of the analog logical voltage signal 528, and depends on the logic input by the signals 506 and 508. In the 10 bit logic example, there are 1024 multipliers 594, and 1023 stages of the adders 600.

As an example for the 2 bit logic, with the 7.5 volt value of the required force Fwp, and the value of 0.25 volts (1 volt divided by 4) of the analog force increment signal 526, to obtain the 7.5 volt value, the sum, or analog logical voltage, signal 528 has the value of 2 volts based on the 2 volt signal 596 from one of the multipliers 594. 2 volts times the increment 0.25 (the exemplary value of the signal 526 in the 2 bit example) gives the product 0.5 volts, which corresponds to the voltage amount above the 7 volt value of the signal 504 corresponding to the voltage value of 7.5 volts of the required force Fwp. In summary, the number of logic states in the evaluation circuit 570 equals the number of multipliers 594, and there is one less adder 600 than the value of the computational resolution.

An example of the exemplary 10 bit logic is as follows when the required pressure Pwp is the exemplary 0.005 psi, and a corresponding required force Fwp is 0.25 pounds for a 200 mm wafer 208, for example. An exemplary voltage range of the signals 236 (FIG. 6B) is 10 volts (which corresponds to a range of 502 pounds of the required force Fwp for a 10 psi maximum pressure P for the 200 mm wafer 208). The value of the inputs 592 may range from zero volts to 10.24 volts in 0.01 volt increments, and as shown in FIG. 14, the difference between the LR voltage signal 504 and the UR voltage signal 502 (the value of the signal 522) may be 9.766 millivolts. The ten logic inputs 506, 508, etc. may thus cause the analog logical voltage signal 528 to change in increments of 9.537 times 10 to the minus six power. As a result, the LR voltage 504 may be increased in increments of 9.537 times 10 to the minus six power. Therefore, the double use of the relatively average 10 bit resolution results in the signals 238 (e.g., the signal 238W in FIG. 14) having a very small incremental value, which significantly improves the accuracy of the force signals 238, and importantly may conform the increments in which the force signals 238 are valued to the increments of the high resolution electromagnetic actuators, for example.

In view of the foregoing description, it may be understood that in the use of the system 200 the accuracy of computations of the pressure P and the force F are less dependent on the use of high resolution, less available digital devices. The CMP system 200 and the described methods therefore provide a way to more accurately compute the values of the forces F that are to be applied to the wafer 204, for example, as the 220 polishing pad moves laterally (arrow 226, FIG. 1A) relative to such wafer 204 during the CMP operations. Moreover, such improved accuracy is achieved even though the computation involves both the digital operations of the processor 212 and the controller 228, for example, and the analog operations of the circuitry 511. Importantly, such improved accuracy is achieved even though it may be necessary to convert values of the required pressure P or force F, for example, from one set of units to a second set of units and then back to the first set of units. In such conversion, it is seen that a pressure value, for example, in the first set of units may have the same value after the conversion as before the conversion. The CMP system 200 thus enable the quantization process to be performed with data from the relatively average resolution digital devices (e.g. the controller 228), and render such relatively average computational resolution of less importance in obtaining computed results having an acceptable accuracy, such as about one percent (1%), whereby quantization errors are eliminated or significantly reduced.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of accurately representing, for computational processing, a desired value among a pressure range of values of pressure to be applied to a wafer in chemical mechanical polishing, comprising the operations of:

dividing the pressure range by the value of a component resolution to define scale portions of the pressure range;

generating a first output signal to identify one of the scale portions that includes the desired value; and generating a second output signal to identify a set point that defines the requested value in the identified scale portion.

2. A method as recited in claim 1, wherein the component resolution is the resolution of a digital device that outputs data representing the identity of the one of the scale portions and of the set point.

3. A method as recited in claim 1, wherein the operation of generating the first output signal comprises:
   converting the identified scale portion to a count value of resolution units;
   dividing a range of the first output signal by the component resolution to define a first signal conversion factor; and
   converting the identified scale portion in resolution units to the first output signal by multiplying the count value of the identified scale portion times the first signal conversion factor.

4. A method as recited in claim 1, wherein the operation of generating the second output signal comprises:
   converting the identified set point to a count value of resolution units;
   dividing a range of the first output signal by the component resolution to define a second signal conversion factor; and
   converting the identified set point in resolution units to the second output signal by multiplying the count value of the identified set point times the second signal conversion factor.

5. A method of reducing quantization error in a computation of chemical mechanical polishing parameter, comprising the operations of:
   defining synchronization data for synchronization operations of first and second digital processors, the synchronization data defining a computational resolution, a set of values of the parameter to be used in computations, a set of values of output parameter data for communications between the first and second digital processors, a scale data conversion function that defines a relationship between the parameter and each one of a plurality of scales into which the set of values of the parameter is divided; a set point data conversion function that defines a relationship between a range of values of the parameter in a particular one of the scales and a set point that defines a required value of the parameter in the particular scale;
   performing a first conversion operation in the first processor and based on the synchronization data, the first conversion operation being performed on a required value of the parameter, the first conversion operation converting the required value of the parameter to first output parameter digital data representing a particular one of the scales;
   performing a second conversion operation in the first digital processor and based on the synchronization data, the second conversion operation being performed on the required value of the parameter to convert the required value to second output parameter digital data representing the set point that defines the required value of the parameter in the particular scale;
   performing a third conversion operation in the second processor and based on the synchronization data, the third conversion operation being performed on the first output parameter digital data to convert the first output parameter digital data to scale data representing the particular one of the scales; and
   performing a fourth conversion operation in the second processor and based on the synchronization data, the fourth conversion operation being performed on the second output parameter digital data to convert the second output parameter digital data to digital data representing the required value of the parameter.

6. A method as recited in claim 5, wherein the first conversion operation includes dividing the computational resolution into the highest value of the set of values of parameter to define the scale data conversion function in terms of a number of the plurality of the scales, each of the scales having a range within the set of values; each range being of equal-value, and wherein the first conversion operation further includes identifying which of the scales corresponds to the required value of the parameter.

7. A method as recited in claim 6, wherein the set point data conversion function is based on the ratio of the required value of the parameter to the range of values of the parameter in the particular scale.

8. A method as recited in claim 6, wherein the synchronization data further includes a definition of a voltage conversion value in terms of numbers of counts per voltage value and wherein the third conversion operation includes multiplying a voltage value of the first output parameter digital data by the voltage conversion value to convert the first output parameter digital data to digital count data, and wherein the synchronization data further includes a definition of a count conversion value in terms of numbers of counts per particular ones of the scales, and wherein the third conversion operation includes multiplying the digital count data value of the first output parameter digital data by the count conversion value to convert the digital count data to the scale data.

9. A method as recited in claim 6, wherein the set point data conversion function further includes a definition of a voltage conversion value in terms of numbers of counts per voltage value, and wherein the fourth conversion operation includes multiplying a voltage value of the second output parameter digital data by the voltage conversion value to convert the second output parameter digital data to digital count data, and wherein the set point data conversion function further includes a definition of a count conversion value in terms of numbers of counts corresponding to the required parameter in the particular one of the scales.

10. A method of reducing quantization error in specifying a chemical mechanical polishing parameter in which a computational resolution is to be used in processing a required value of the parameter to obtain a computed value of the parameter, comprising the operations of:
   defining a relatively average value of the computational resolution;
   defining a set of values of the parameter, the set containing possible values of the parameter, the set of possible parameter values including the required value of the parameter;
   dividing the highest value of the parameter of the set by the relatively average value of the computational resolution to obtain a series of parameter scales of the set, the parameter scales representing uniformly increasing possible values of the parameter, the scales having equal ranges of value of the parameter each of which ranges has a value in excess of the value of the required parameter;
   providing a different first identifier for each of the scales of the parameter, the number of different first identifiers being equal to the value of the computational resolution; and
   specifying the required value of the parameter by providing a different second identifier to indicate a set point value within any specific one of the scales, the set point corresponding to any particular parameter value, the number of different second identifiers being equal to the value of the computational resolution.

11. A method as recited in claim 10, wherein the specific required value of the parameter is to be communicated to a processor for processing the required value of the parameter, comprising the further operations of:

generating a two-part output representing the required value of the parameter, the output including first data representing the first identifier that corresponds to the specific one of the scales that includes the required value of the parameter, the output further including second data representing the second identifier that corresponds to the required value of the parameter within the specific one of the scales.

12. A method as recited in claim 11, the method further comprising the operation of:

receiving the first and second data of the output; and converting the output to the exact amount of the required value of the parameter by selecting one of the parameter scales corresponding to the first identifier, and by selecting a value within the selected parameter scale corresponding to the second identifier.

13. A method as recited in claim 10, wherein the operation of defining the relatively average value of the computational resolution defines a resolution not higher than 10 bits; the method further comprising the operation of:

converting the two-part output to a force to be applied to a wafer, the value of the force corresponding to the required value of the pressure.

14. A method of reducing quantization error in an analog computation for converting an input representing force in terms of units of force to an analog force output representing force in terms of a force actuator signal, comprising the operations of:

converting the input to two analog force signals and a plurality of digital logic signals, the analog force signals representing the boundaries of a range of force actuator signals to be input to a force actuator, the range including a force actuator signal having a value corresponding to the value of the force in force units; the digital logic signals having a resolution less than or equal to 12 bits, the digital logic signals representing the force actuator signals in the range having the value corresponding to the value of the force in force units;

based on the resolution of the digital logic signals, converting a difference between the two analog force signals to an analog force increment signal;

based on logic defined by the digital logic signals, converting the analog force increment signal to an analog force set point signal; and adding one of the analog force signals to the analog force set point signal to determine the value of the force actuator signal.

15. A method as recited in claim 14, the operation of converting the difference comprising the operations of:

determining the difference between the two analog force signals to output an analog range signal representing the range of the force actuator signals; and dividing the analog range signal by the resolution of the digital signals to output the analog force increment signal.

16. A method as recited in claim 14, the operation of converting the analog force increment signal comprising the operations of:

using the digital logic signals to select an analog logical signal; and multiplying the analog force increment signal by the logical analog signal to output the analog force set point signal.

17. A method as recited in claim 14, wherein each of the force actuator signal, the two analog force signals, the analog force increment signal, and the analog force set point signal is a voltage signal.

* * * * *